(12) United States Patent
Onmori et al.

(10) Patent No.: US 6,669,014 B2
(45) Date of Patent: Dec. 30, 2003

(54) MAGNETIC TAPE CASSETTE STORAGE CASE

(75) Inventors: Shozo Onmori, Kanagawa (JP); Kiyoo Morita, Kanagawa (JP); Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/060,187

(22) Filed: Feb. 1, 2002

(65) Prior Publication Data

US 2002/0070132 A1 Jun. 13, 2002

Related U.S. Application Data

(62) Division of application No. 09/763,209, filed as application No. PCT/JP99/04422 on Aug. 17, 1999.

(30) Foreign Application Priority Data

Aug. 18, 1998 (JP) ........................................ P. 10-231764

(51) Int. Cl.⁷ .............................................. B65D 69/00
(52) U.S. Cl. .................................. 206/232; 206/387.13
(58) Field of Search ............................ 206/387.1, 232, 206/459.1, 472, 308.1, 312, 387.13

(56) References Cited

U.S. PATENT DOCUMENTS

| | | | |
|---|---|---|---|
| 4,341,307 A | * 7/1982 | Shyers | ........................ 206/472 |
| 4,363,403 A | 12/1982 | Raucci, Jr. et al. | |
| 4,518,275 A | 5/1985 | Rauch, III et al. | |
| 4,593,814 A | 6/1986 | Hagiwara et al. | |
| 4,717,021 A | * 1/1988 | Ditzig | .................... 206/387.13 |
| 4,718,550 A | * 1/1988 | Johnson | ................ 206/387.13 |
| 4,784,264 A | * 11/1988 | Sykes | ..................... 206/387.13 |
| 4,869,364 A | 9/1989 | Bray | |
| 5,145,068 A | * 9/1992 | Schmitz et al. | .............. 206/472 |
| 5,285,918 A | 2/1994 | Weisburn et al. | |
| 5,499,714 A | 3/1996 | Konno | |
| 5,568,863 A | * 10/1996 | Weavers | .................. 206/387.1 |
| 5,609,250 A | * 3/1997 | Moser | .................... 206/387.13 |
| 5,638,952 A | 6/1997 | Kim | |
| 5,645,165 A | 7/1997 | Taniyama | |
| 5,772,028 A | 6/1998 | Marsilio et al. | |
| 5,782,352 A | 7/1998 | Senda | |
| 5,826,720 A | 10/1998 | Morita | |
| 6,009,999 A | 1/2000 | Morita et al. | |
| 6,367,623 B1 | * 4/2002 | Tully et al. | ................. 206/232 |

FOREIGN PATENT DOCUMENTS

| | | |
|---|---|---|
| DE | 33 24 126 | 1/1985 |
| DE | 33 35 558 | 4/1985 |
| FR | 2 514 187 | 4/1983 |
| GB | 2 064 486 | 6/1981 |
| GB | 2 162 826 | 2/1986 |
| GB | 2 179 328 | 3/1987 |
| NL | 9 001 188 | 12/1991 |
| WO | WO 96 35213 | 11/1996 |

OTHER PUBLICATIONS

International Search Report.

* cited by examiner

Primary Examiner—Shian Luong
(74) Attorney, Agent, or Firm—Sughrue Mion, PLLC

(57) ABSTRACT

A storage case for a magnetic tape cassette comprises a storing portion 12 for storing the magnetic tape cassette, a lid portion 16 having an outer wall 28 surrounding the storing portion, and a hinge portion 14 for connecting the storing portion and the lid portion to be opened and closed, all of which are formed of synthetic resin. At least a pair of pressing ribs 32 are provided inside an outer wall 28 of the lid portion 16 to contact a peripheral edge of a surface of the magnetic tape cassette 10 when the magnetic tape cassette is stored, thereby holding the magnetic tape cassette between the pressing ribs 32 and the storing portion 12. By means of the pressing ribs 32, a gap D for containing the information sheets is defined between the lid portion 16 and the magnetic tape cassette 10. The pressing ribs 32 further include respective holding ribs 34 projectingly formed in a direction of the cassette face for holding paper ends of the information sheets, to thereby contain and hold a large amount of information sheet.

5 Claims, 22 Drawing Sheets

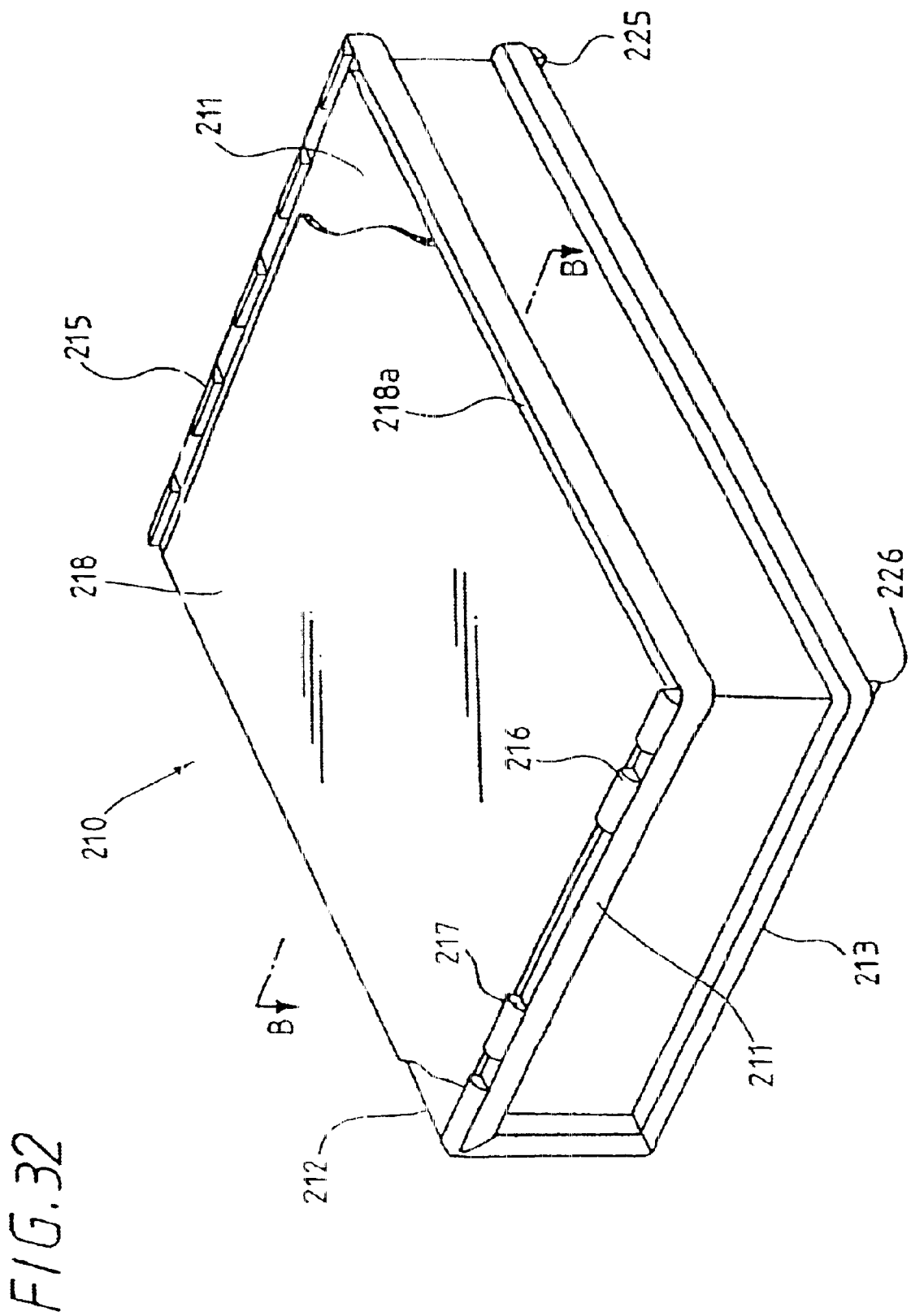

MAGNETIC TAPE CASSETTE STORAGE CASE

This is a divisional of U.S. application Ser. No. 09/763,209 filed Feb. 20, 2001, which is a National Stage Application filed under §371 of PCT Application No. PCT/JP99/04422 filed Aug. 17, 1999; the above noted prior applications are all hereby incorporated by reference.

TECHNICAL FIELD

This invention relates to a storage case for protecting a magnetic tape cassette, such as a digital video cassette or the like.

BACKGROUND ART

Among various broadcasting apparatuses used in a broadcasting station or the like, a compact and portable digital video camera has been recently used as a TV camera exclusively for news gathering by video recording. This type of camera has been used by many cameramen in the broadcasting station and specialists in a field of video recording, etc. because high grade pictures can be obtained by digital signal processing with this type of camera, even though it is of small-size.

Three types of digital video cassettes(DVC) having different recording times have been used for loading in this portable digital video camera. They are encased in three different cases respectively to be sold on market.

The magnetic tape cassette such as the digital video cassette or the like has been used in many cases, for recording such matters as important on business, for example, for video recording on the actual spot of news gathering, for reproducing thereafter in the broadcasting station for editorial purpose, etc. For this reason, an information of record accompanying the video record is also important, and often contained in the same storage case to carry it with the magnetic tape cassette. By treating the record information in this way, an indication of the video record contained in the magnetic tape cassette, related information on the actual spot, etc. can be easily confirmed by referring to the contents of the video record afterward at a meeting or so.

Conventionally, the video record information of this type has been usually indicated on a label attached to a surface of the magnetic tape cassette and the storage case, or on a sheet or a leaflet inserted into a gap in the storage case. However, since the storage case has a thickness for containing only the magnetic tape cassette, only a small amount of the information sheets can be stored together with the magnetic tape cassette.

It is conceived, therefore, to widen the gap d for containing the information sheets between a storing portion 1 and a lid portion 2 of the case as shown in FIG. 1. For preventing the magnetic tape cassette from moving in a stored state, a plurality of ribs 4 are projectingly formed at inner side walls of the lid portion 2 to press a peripheral edge of the magnetic tape cassette 3 toward the storing portion 1. By making these ribs 4 higher, the gap d can be widened.

However, the information sheets 5 contained in the gap d are not fixed in this arrangement. In case where a number of the sheets are overlapped, the information sheets 5 will jump out when the lid portion 2 is opened, or edges of the sheets are folded or protrude out of the case since the sheets are not fixed in a position. This makes the lid portion inoperable to be locked into a closed position. This arrangement is thus inconvenient in use. This is a first problem of the conventional cassette case.

In addition to this, the conventional storage case for storing the magnetic tape cassette is formed compact according to an outer dimension of the magnetic tape cassette. As shown in FIG. 2, it consists of a storing portion 101, a lid portion 108 connected by means of a connecting piece 107 at a longitudinal side of the storing portion 101, all of which are integrally formed of synthetic resin, and adapted to be opened or closed by means of thin portions 109 which are formed along edges between the storing portion 101 and the connecting piece 107 as well as between the connecting piece 107 and the lid portion 108.

However, in the magnetic tape cassette storage case of this type a thickness of the resin is considerably thin. Especially at the side of the storing portion 101, lateral walls for holding the cassette are simply formed upright at the four corners of a bottom plate of a flat plate, and when external forces are applied in the longitudinal direction of the storing portion 101 as shown by arrows in FIG. 2, the storing portion 101 swells outward as shown by a dotted line, as a so-called open-mouth phenomenon, thus causing inconveniences, for example, dust prevention property falls, external forces are exerted on the magnetic tape cassette contained inside, locking is easily disengaged to make the magnetic tape cassette slip off, and so on.

The magnetic tape cassette as above described is provided at both sides of the storing portion and the lid portion with locking projections and locking recesses which are adapted to elastically engage with each other in a closed state. In spite of provision of such locking mechanism, the above described open-mouth phenomenon has occurred due to elasticity of the resin.

Although such deflection can be overcome by thickening the resin to increase rigidity, this will incur an increase of cost for materials for molding, and cost for exterior package will be higher as compared with cost for the product. Moreover, the external appearance will not be so good in this case.

Further, a back label having a bar code is often attached to a back face of the magnetic tape cassette. Through the storage case which is transparently formed, the bar code on the back label of the magnetic tape cassette can be read from the outside. In such a case, if the locking mechanism is provided in a position where the open-mouth phenomenon occurs, the locking mechanism will be an obstacle for reading, or the reading area on the bar code deforms due to elastic deformation by locking, thus resulting in imperfect reading. This is a second problem of the conventional cassette case.

Further, a magnetic tape cassette is usually stored in a magnetic tape cassette storage case in order to protect the magnetic tape cassette from dust or a shock from the exterior. FIGS. 3 and 4 show such a conventional magnetic tape cassette storage case, of which FIG. 3 is a perspective view and FIG. 4 is a sectional view taken along a line A—A in FIG. 3.

This type of magnetic tape cassette storage case 201 comprises a storing portion 204 provided with lateral walls 205, a lid portion 202, and a connecting piece 203 for connecting the storing portion 204 and the lid portion 202, all of which are integrally formed of synthetic resin. This magnetic tape cassette storage case 201 is provided with a transparent sheet 206 so as to cover apart of the lid portion 202 and the connecting piece 203. The transparent sheet 206 is stretchingly provided with its one side edge 206a welded to the lid portion 202 of the case 201 and with its other side edge 206b welded to the storing portion 204. Information sheets such as a label, a record memorandum or the like are inserted between the transparent sheet 206 and the lid portion 202 for storage.

In the conventional magnetic tape cassette storage case 201, the transparent sheet 206 covers only a part of the lid portion 202 and the connecting piece 203 (about one-third of the lid portion 202 in FIG. 3). Therefore, in case where the information sheet to be inserted has a size as large as the case 201, the information sheet will protrude out of the sheet 206. Therefore, when something touches a portion of the information sheet, there may be a fear that the information sheet slips out due to friction from between the sheet 206 and the lid portion 202. Even when the information sheet is completely inserted between the transparent sheet 206 and the lid portion 202, the information sheet, if it is thin, may come out from between the transparent sheet 206 and the lid portion 202 while carrying the case. This is a third problem of the conventional cassette case.

DISCLOSURE OF THE INVENTION

It is an object of the present invention to solve the above-mentioned problem of the conventional art.

In particularly, an object of a first aspect of the present invention is to overcome the above described first problem, and to provide a magnetic tape cassette storage case which can contain a large amount of information sheets for carrying them with the magnetic tape cassette by adding a simple arrangement.

The above object of the present invention can be achieved by providing a storage case for a magnetic tape cassette comprising a storing portion for storing the magnetic tape cassette, a lid portion having an outer wall surrounding the storing portion, and a hinge portion for connecting the storing portion and the lid portion to be opened or closed, all of which are integrally formed, characterized in that at least a pair of pressing ribs are provided inside the outer wall of the lid portion to contact a peripheral edge of a surface of the magnetic tape cassette when the magnetic tape cassette is stored, thereby holding the magnetic tape cassette between the pressing ribs and the storing portion, the pressing ribs defining a gap between the lid portion and the magnetic tape cassette for containing information sheets, said pressing ribs including respective holding ribs projectingly formed in a direction of the cassette face, thereby holding paper ends of the information sheets.

With the above arrangement according to the present invention, inconveniences such as jumping out, falling, protruding of the information sheets can be eliminated, by gripping the paper ends of the information sheets with the holding ribs formed at the pressing ribs provided inside the lid portion to secure the information sheets in thus fixed position.

The pressing ribs can be formed two each on three faces of the outer wall of the lid portion. Providing as many pressing ribs as possible in this way will enhance holding force against the information sheets.

In order to improve insertion workability of the information sheets into the holding ribs, while maintaining the holding force to a certain extent, the following arrangement is preferable.

The pressing ribs having the holding ribs may be formed at one side of the outer wall of the lid portion and at a backward outer wall which is located behind the cassette when the lid is closed. The other side outer wall may be provided with the pressing rib of the type without the holding rib which serves as a spacer for the information sheets while pressing the magnetic tape cassette. With such an arrangement of the ribs, the information sheets need not be positioned in alignment with the two confronting ribs formed at the side outer walls, and insertion of the information sheets 17 can be performed smoothly, thus enhancing the workability.

Inside one of the sideward outer walls of the lid portion may be formed with the pressing rib having the above described G holding rib, and inside the other sideward outer wall may be formed with the pressing rib which is not provided with the holding rib and functions only as a spacer for the information sheets while pressing the magnetic tape cassette. In other words, a pair of the pressing ribs consisting of the pressing rib having the above described holding rib and the pressing rib without the holding rib are formed confrontingly at the inner faces of the sideward outer walls of the lid portion to hold the information sheets.

With this structure too, the information sheets need not be positioned in alignment with the two confronting ribs formed inside the sideward outer walls. Therefore, insertion of the information sheets can be performed more smoothly, thus improving the workability. Further, since the holding rib may be provided inside a corner between the two adjacent outer walls so as to bridge the two outer walls, the holding rib functions as a reinforcing clamp member, thus preventing deformation such as inclination of the two outer walls.

The pressing rib in the present invention may be so constructed as to simply press the cassette to hold it, or as to simply abut the cassette, or maybe so constructed as to simply define the space for containing the cassette leaving gaps around the cassette.

In addition to this, it is an object of a second aspect of the present invention to overcome the above described second problem by adding a simple arrangement and to provide a magnetic tape cassette storage case which is hard to flex and hard to cause the open-mouth even though material having the same thickness is employed.

The above object of the present invention can be achieved by a magnetic tape cassette storage case, which comprises a storing portion for storing the magnetic tape cassette, a lid portion having an outer wall surrounding the storing portion, and a connecting piece for connecting the storing portion and the lid portion to be opened or closed, all of which are integrally formed of synthetic resin, characterized in that the storing portion is formed with a recess at a mating position between the storing portion and the lid portion in a closed state at a longitudinally middle portion, while the lid portion is formed with a projection for engaging with said recess.

According to the above-mentioned construction of the invention, when an external force is applied to the storing portion to flex it outward in the longitudinal direction, the recess is caused to decrease. However, the decrease of the recess is hindered by the projection of the lid portion, thus maintaining the storing portion rectilinearly.

The above described object of the present invention can be achieved by a magnetic tape cassette storage case according to the present invention, which comprises a storing portion for storing the magnetic tape cassette, a lid portion having a transparent outer wall surrounding the storing portion, and a connecting piece for connecting the storing portion and the lid portion to be opened or closed, all of which are integrally formed of synthetic resin, characterized in that the storing portion is formed with an engaging projection at a mating position between the storing portion and the lid portion in a closed state at a longitudinally middle portion, while the lid portion is formed with an engaging recess for engaging with said engaging projection thereby to constitute a locking mechanism, the locking mechanism being formed at a position off a reading area of a bar code on a back label provided on a back face of the magnetic tape cassette.

According to the invention, because the case is locked at the mating position between the storing portion and the lid portion which tend to open, there will be no open-mouth. Further, because the locking position is out of the bar code reading position on the label of the magnetic tape cassette, the locking mechanism will not be an obstacle for the bar code reading, and an inconvenience caused by the elastic deformation of the locking mechanism can be eliminated.

Further, the above described object of the present invention can be achieved by a magnetic tape cassette storage case according to the present invention, which comprises a storing portion for storing the magnetic tape cassette, a lid portion having an outer wall surrounding the storing portion, and a connecting piece for connecting the storing portion and the lid portion to be opened or closed, all of which are integrally formed of synthetic resin, characterized in that a bottom plate of the storing portion and a lid plate of the lid portion are formed projectingly outward beyond their lateral wall and outer wall, a projected part at one side of shorter edges of the storing portion being cut away, whereby a load from longitudinal both ends is applied to only the projected part of the lid portion.

According to the invention, because the projected part of one side portion of the shorter edges of the storing portion is cut away, the external force itself will not be applied to the storing portion. Moreover, because there is provided no deflection preventing mechanism nor the locking mechanism, the arrangement for preventing the open-mouth can be most easily realized.

In view of the above, it is an object of the present invention to overcome the above-mentioned third problem by providing a magnetic tape cassette storage case which can contain the information sheet as large as the storage case and which is free from the risk of slipping out of the information sheet from between the transparent sheet and the lid portion.

The above-mentioned object of the present invention can be achieved by providing a magnetic tape cassette storage case comprising a storing portion for receiving the magnetic tape cassette, a lid portion for covering the storing portion, and a connecting piece for connecting the storing portion and the lid portion to be opened or closed, all of which are integrally formed of synthetic resin, characterized in that the lid portion is formed with ridges at its longitudinal opposite edges, a transparent sheet being provided between the ridges with its one side edge welded to a latitudinal side edge of the lid portion to cover at least the lid portion and the connecting piece, the other side edge of the transparent sheet being welded to the storing portion.

According to the present invention, the transparent sheet is spread over the entire face of the lid portion and the connecting piece. Therefore, the information sheet having a satisfactorily large dimension can be contained between the lid portion and the connecting portion, and the contained information can be prevented from dropping out by means of the ridges.

It is preferable in this invention that at least one of the ridges are provided with a cut-out.

With this structure, a man's finger can be inserted through the cut-out into between the transparent-sheet and the lid portion, thus enabling the information sheet contained therein to be pulled out easily.

Further, in case where the cut-out is formed in at least one of the ridges, it is preferable to form another cut-out in a corresponding edge of the lid portion.

With this arrangement, the finger can be inserted from the cut-out in the lid portion through the cut-out in the ridge, and therefore, it will be more easily achieved to pull out the information sheet from the inside.

In addition to the above-described structure, further ridges may be provided also in longitudinal opposite edges of the connecting piece and the storing portion. In this case too, the cut-out is preferably formed in either of the ridges, and more preferably the cut-out may be formed in the edges of the corresponding connecting piece and storing portion.

The transparent sheet may cover the continuing entire surface of the lid portion, the connecting piece and the storing portion.

BRIEF DESCRIPTION OF THE DRAWINGS

FIG. 32 is a perspective view of another exemplary embodiment of the magnetic tape cassette storage case according to a fifteenth embodiment of the present invention.

BEST MODE FOR CARRYING OUT THE PRESENT INVENTION

Figure 5:
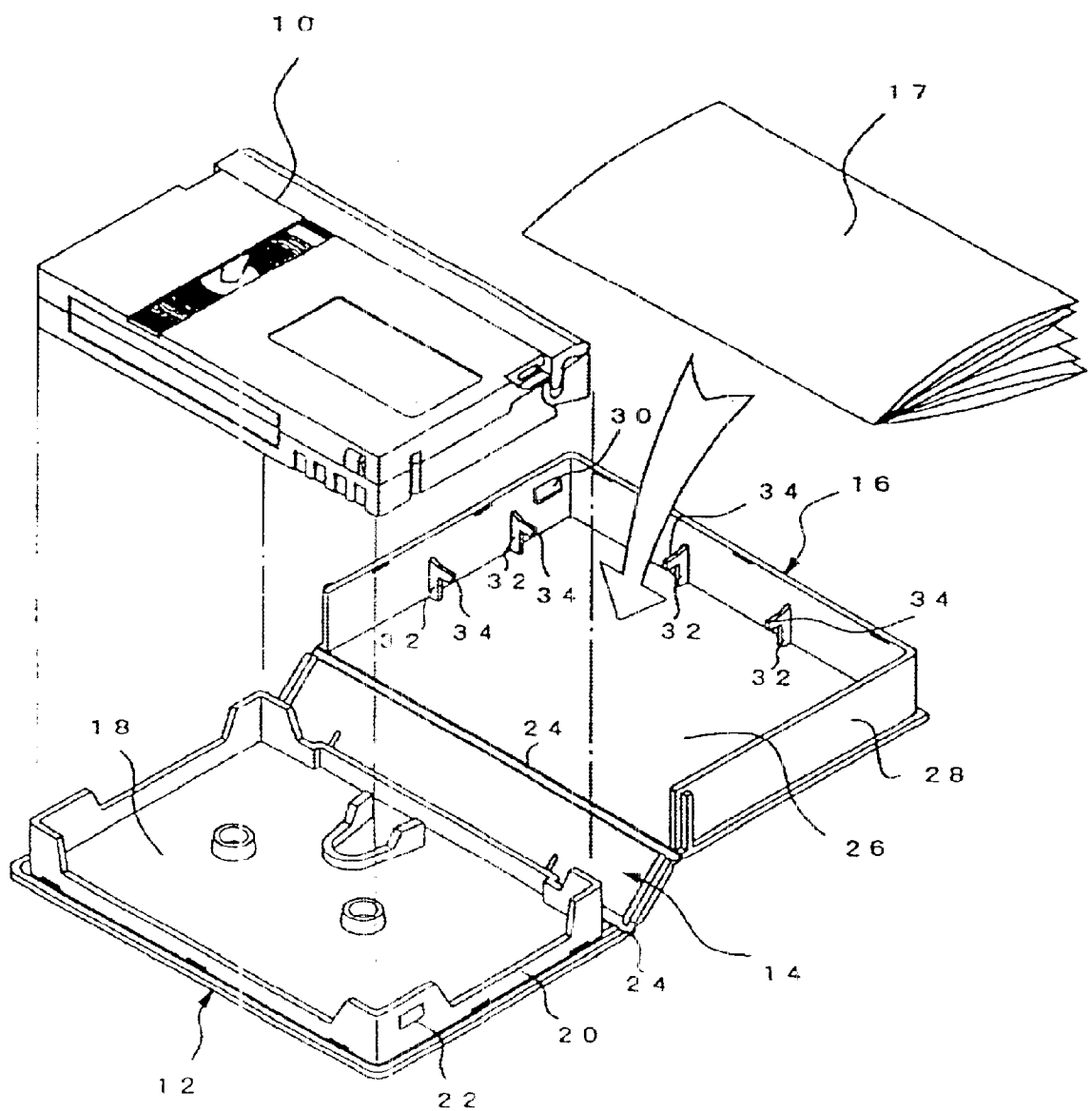
FIG. 5 is a developed view of the magnetic tape cassette storage case according to the first embodiment of the present invention.
Figure 6:
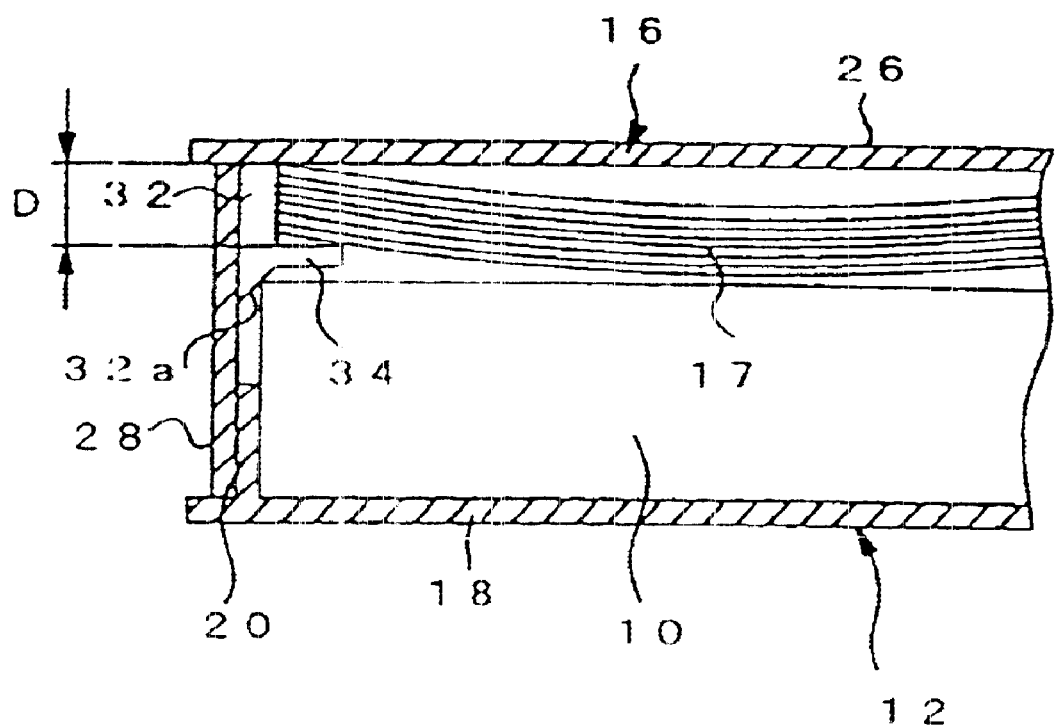
FIG. 6 is a part of a sectional view showing the case in a closed state of the lid portion.

With reference to the accompanying drawings, a preferred embodiment according to the present invention will be hereunder explained in detail. FIGS. 5 and 6 show a first embodiment of this invention, of which FIG. 5 illustrates it in an open state, and FIG. 6 illustrates it in a closed state.

In the drawings, the storage case is manufactured by injection molding, etc. and has a storing portion 12 for receiving the magnetic tape cassette 10, a lid portion 16 integrally connected to the storing portion 12 at its longitudinal side by means of a hinge portion 14. A storage space for the information sheets 17 is formed inside the lid portion 16.

The storing portion 12 is formed in a rectangular shape according to an exterior dimension of the magnetic tape cassette, and comprises a bottom plate 18 which has at its inner face a plurality of fitting protuberances and recesses corresponding to a configuration of the magnetic tape cassette 10, and a frame-like lateral wall 20 which is formed upright around the bottom plate 18 with its four corners made higher and adapted to freely receive the magnetic tape cassette 10. Locking recesses 22 for the lid portion 16 are formed at both side portions of the lateral wall 20 at their forward end.

Both longitudinal side portions of the hinge portion 14 are foldably, extendably and integrally connected to the bottom plate 18 of the storing portion 12 and the lid portion 16 by means of respective thin hinges 24.

The lid portion 16 comprises a lid plate 26 hingeably connected to the hinge portion 14 and an outer wall 28 of a yoke-shaped framework adapted to fit around the outer side portion of the lateral wall 20. A height of the outer wall 28 and a width of the hinge portion 14 are set so as to correspond to a sum of a thickness of the magnetic tape cassette 10 and the information sheets to be stored.

A pair of locking projections 30 are formed inside rotating ends of both side portions of the outer wall 28 for engaging with the locking recesses 22 and holding the lid portion in a closed state.

On inner three faces of the outer wall 28, are projectingly formed pressing ribs 32, two each on a face. The pressing ribs 32 are adapted to contact peripheral edges of the top face of the magnetic tape cassette 10 when stored in the case, to leave a space for containing the information sheets Each of the pressing ribs 32 has a slanting end 32a which is adapted to press each of three peripheral walls of the magnetic tape cassette 10 with a predetermined elasticity thereby to restrain the magnetic tape cassette 10 from moving inside and give a force to the lid portion to open when the lock is disengaged.

As shown particularly in FIG. 6, each the pressing rib 32 has a holding rib 34 for holding the information sheets 17, which is formed integrally in continuation with the slanting face 32a in a direction of the cassette face. The information sheets 17 has a dimension corresponding to the inner dimension of the lid portion 16, and are folded several times or bundled to form a booklet as shown in FIG. 5. The sheets can be secured in a fixed position by means of the holding ribs 34, by inserting paper edges into a gap D between the under portion of the ribs 34 and the inner face of the lid plate 16 as shown in FIG. 6, thus preventing the sheets from jumping out, falling, protruding, etc.

Figure 7:
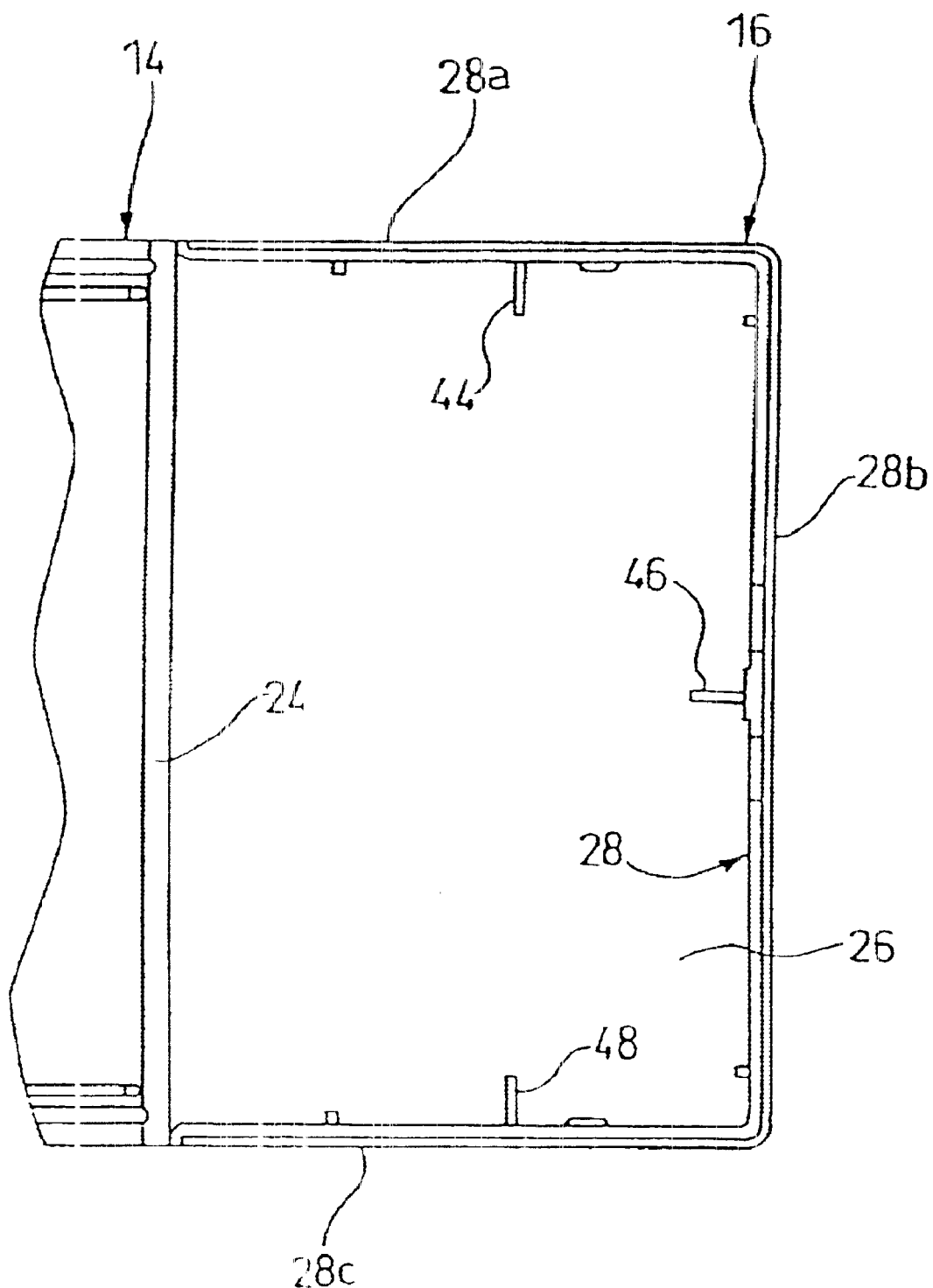
FIG. 7 is a plan view of the storing portion of the storage case according to the second embodiment of the present invention.

Now, a second embodiment according to the present invention will be explained. FIG. 7 is a plan view of the storage case of the second embodiment. Since the entire structure is almost the same as that of the first embodiment, the explanation will be simplified or omitted. The second embodiment is intended to improve workability of inserting the information sheets.

Similarly to the first embodiment, the lid portion 16 comprises the lid plate 26 hingeably connected to the hinge portion 14, and an outer wall 28 of a yoke-shaped framework formed upright inside the lid plate 26, that is, around the face confronting the storing portion 12 to fit the outer face of the lateral wall 20.

On the inner three faces of the outer wall 28, are formed pressing ribs 44, 46, and 48 respectively, which are adapted to contact peripheral edges of the top face of the magnetic tape cassette 10 stored therein, to leave a space for containing the information sheets 17.

Figure 8A:
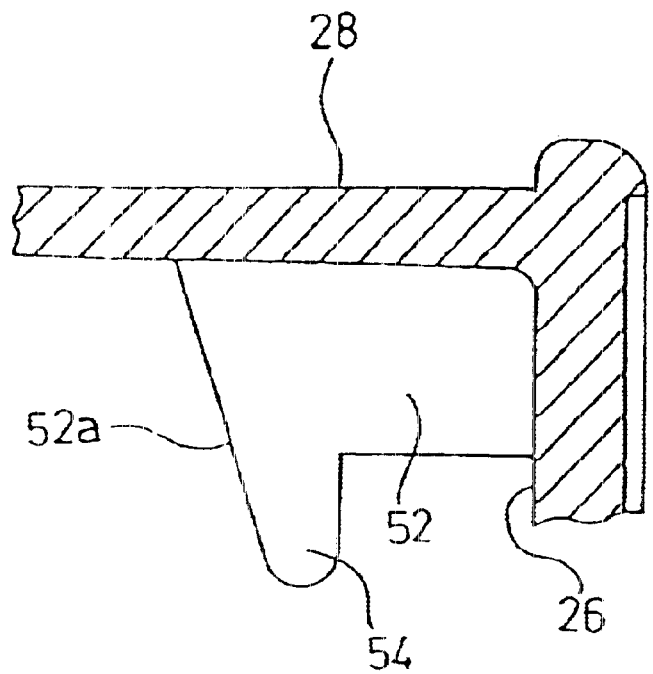
FIGS. 8(a) and (b) are respectively sectional views showing the pressing ribs of the second embodiment in FIG. 7.
Figure 8B:
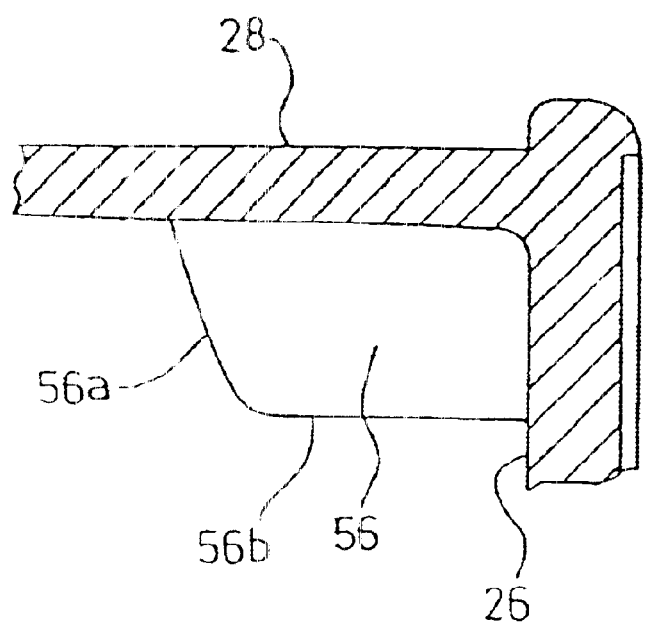

FIGS. 8(a) and 8(b) illustrate shapes of the pressing ribs 44, 46 and 48. The followings are an explanation referring to FIGS. 8)(a) and 8(b). The pressing rib 52 shown in FIG. 8(a) is slanted at the forward end similarly to the pressing rib shown in FIGS. 5 and 6. Thus formed slanting face 52a presses the periphery of the magnetic tape cassette 10 with a predetermined elasticity thereby to restrain the magnetic tape cassette 10 from moving inside and give a force to the lid portion to open when the lock is disengaged. Each the pressing rib 52 has a holding rib 54 for holding the information sheets 17, which is formed integrally in continuation with the slanting face 52a in a direction of the cassette face.

In contrast, the pressing rib 56 as shown in FIG. 8(b) is slanting at the forward end. The slanted face 56a is the same as the rib shown in FIG. 8(a) in that the slanting face 56a presses the periphery of the magnetic tape cassette 10 with a predetermined elasticity thereby to restrain the magnetic tape cassette 10 from moving inside and give a force to the lid portion to open when the lock is disengaged. However, it is different in that a holding face 56b for defining the space to store the information sheets is integrally formed in continuation with the slanting face 56a. This means that the relevant pressing rib 56 is not provided with such a holding rib as extends in the direction of the cassette face.

In the second embodiment, the pressing rib 44 formed on the outer wall 28a at one side and the pressing rib 46 formed on the backward outer wall 28b which is located behind the cassette in the closed position of the lid portion are of such shape as illustrated in FIG. 8(a), while the pressing rib 48 formed on the outer wall 28c at the other side is of such shape as illustrated in FIG. 8(b). With this arrangement, the information sheets 17 need not be positioned in alignment with the pressing rib 48, and therefore, different from the first embodiment, the opposite ends of the information sheets 17 need not be positioned in alignment with the confronting ribs on the both sides of the outer wall. In other words, the information sheets 17 can be secured only by means of the pressing ribs 44 and 46, which cross each other at right angles if extended. Thus, insertion of the information sheets 17 can be performed smoothly and the workability will be improved. Since the information sheets 17 are held by means of the holding ribs of the pressing ribs 44 and 46, the holding force can be maintained to some extent.

As a variation of the second embodiment, all of the pressing ribs 44, 46 and 48 may be formed of the same shape as illustrated in FIG. 8(a). In such a relationship too, the information sheets need not be positioned in alignment with the two pressing ribs which are respectively formed on the same outer wall, and can be smoothly inserted, thus enhancing the workability.

Figure 9:
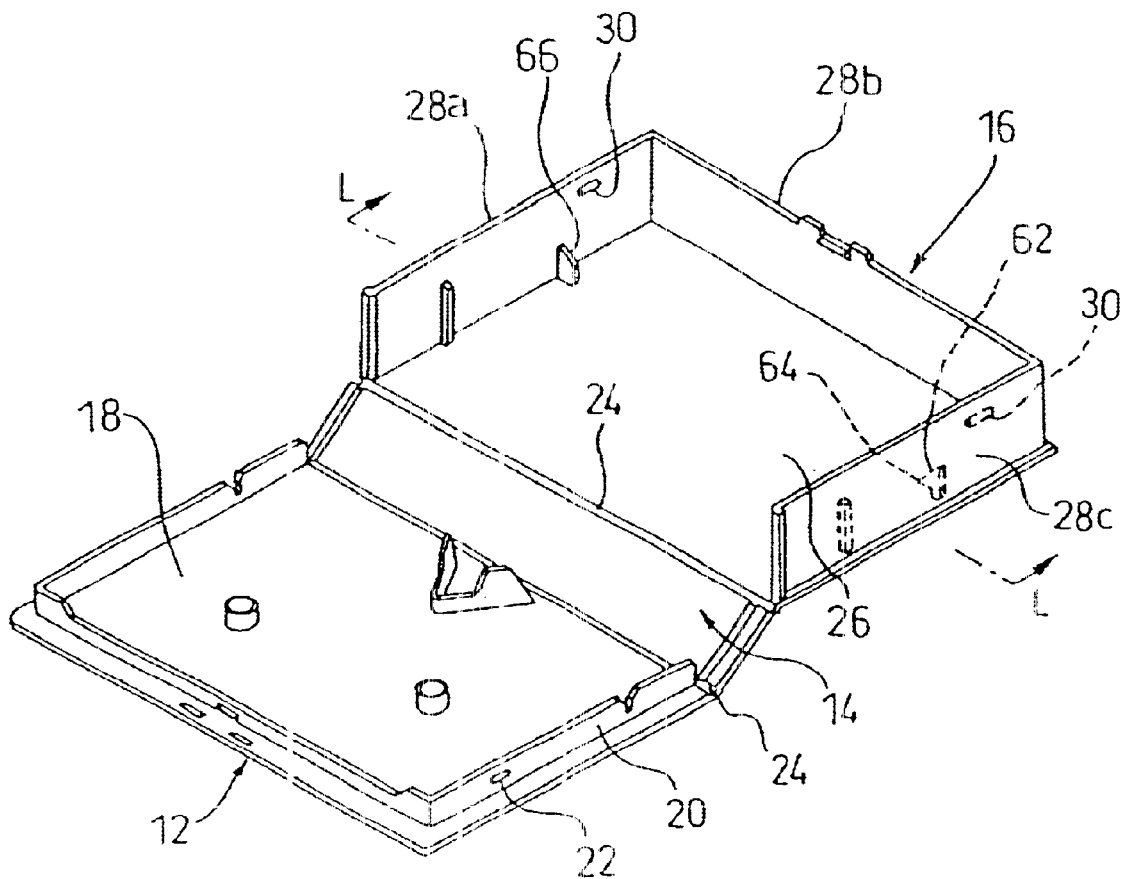
FIG. 9 is a developed view of the storage case according to the third embodiment of the present invention.
Figure 10:
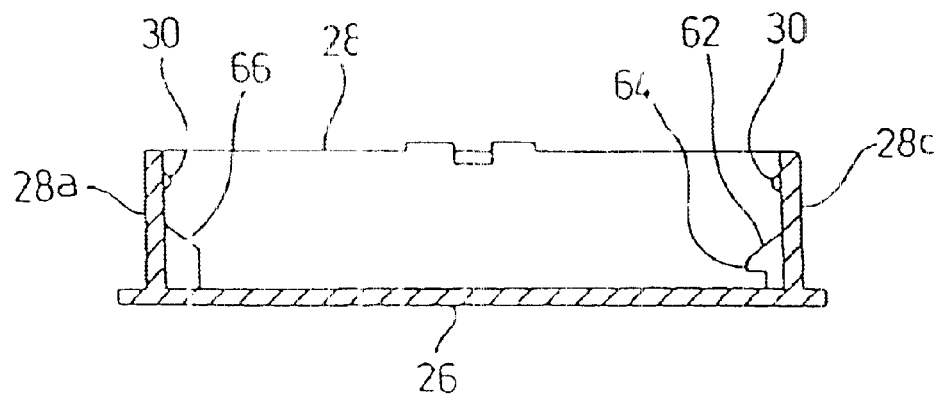
FIG. 10 is a sectional view taken along a linse L—L of FIG. 9.

Now, a third embodiment according to the present invention will be explained referring to FIGS. 9 and 10. FIG. 9 is a developed view of the storage case according to the third embodiment of the present invention, and FIG. 10 is a sectional view taken along a line L—L in FIG. 9. In this third embodiment, a pair of pressing ribs 62 and 66 are formed inside the sideward outer walls 28a and 28c which confront each other.

Since the entire structure of the third embodiment is almost the same as that of the storage case in the second embodiment, the same members as in the second embodiment are designated by the same reference numerals, and the explanation will be simplified or omitted.

In the third embodiment, inside the confronting sideward outer walls 28a and 28c are provided with a pair of pressing ribs 62 and 66, while the backward outer wall 28b is not provided with such a pressing rib. One of the pressing ribs 62 is formed with a holding rib 64 and the other pressing rib 66 is not formed with such a holding rib. This pressing rib 66 without the holding rib will come into contact with side edges of the information sheets 17 and serve as a spacer for defining the position of the information sheets 17. With this structure, the information sheets 17 need not be positioned in alignment with the two pressing ribs formed on the same outer wall as in the first embodiment. Therefore, as compared with the structure in the first embodiment, insertion of the information sheets 17 can be performed more smoothly, thus improving the workability.

Figure 11:
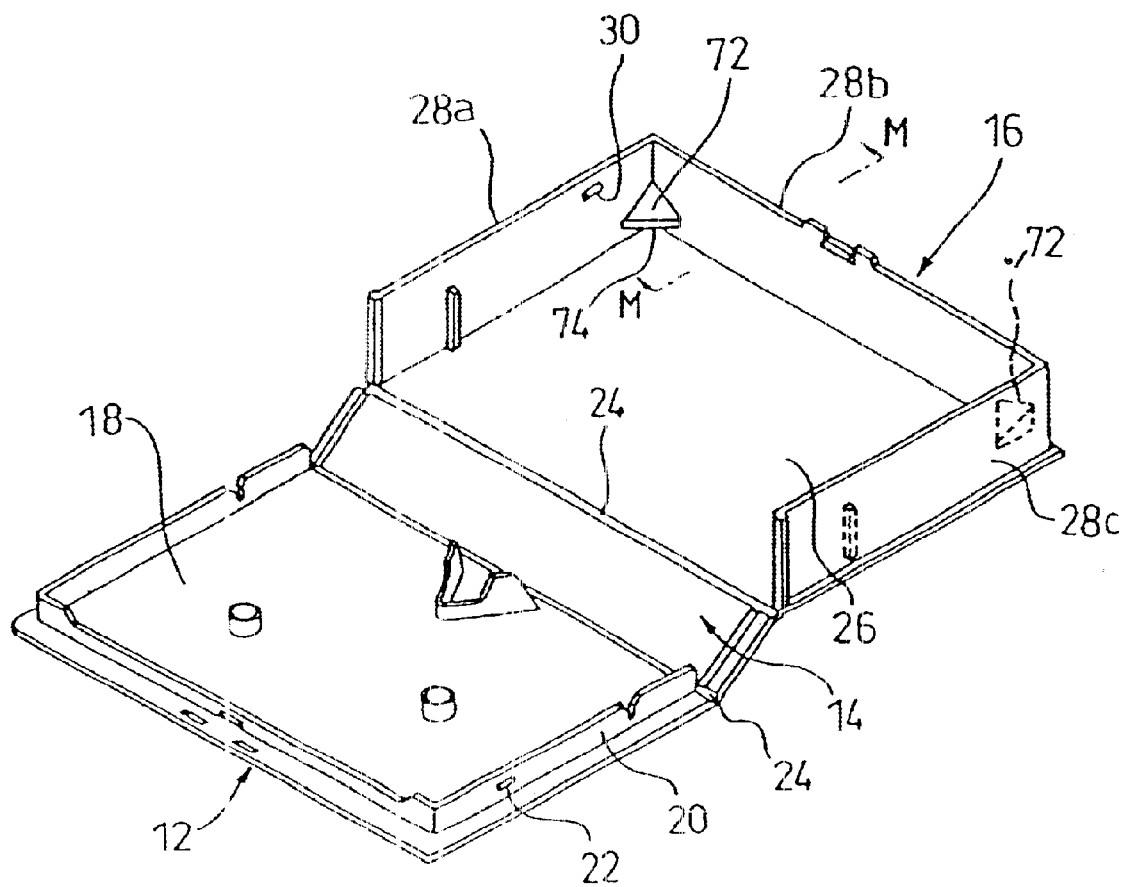
FIG. 11 is a developed view of the storage case according to the fourth embodiment of the present invention.
Figure 12:
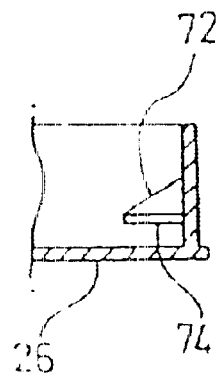
FIG. 12 is a sectional view taken along a line M—M of FIG. 11.

Now, a fourth embodiment of the present invention will be described. FIG. 11 is a developed view of the storage case according to the fourth embodiment of the present invention, and FIG. 12 is a sectional view taken along a line M—M in FIG. 11.

In this fourth embodiment, inside corners between the adjacent two outer walls 28a and 28b, and 28b and 28c respectively, pressing ribs 72 having sheet holding ribs 74 integrally formed therewith are provided in such a manner that the pressing ribs 72 bridge between the two outer walls 28a and 28b, and 28b and 28c like eaves. The pressing rib 72 is in a form of a quadrangular pyramid divided in four, of which a face confronting the cassette serves as a cassette pressing part and a face confronting the lid plate 26 serves as a holding part for the information sheets.

With the structure wherein the pressing ribs 72 are formed inside the corners between the two adjacent outer walls 28a and 28b, and 28b and 28c bridging both the adjacent walls respectively, the pressing ribs 72 function as reinforcing clamp members. Rigidity of the lid portion 16 is increased and deformation of the lid portion 16 will be prevented. For example, deformation such as inclination of both the outer walls 28a and 28b, and 28b and 28c during thermal shrinkage after injection molding will be avoided, and even when an outer force is applied to the lid portion 16, the outer walls 28a, 28b and 28c will not be deformed.

Figure 13:
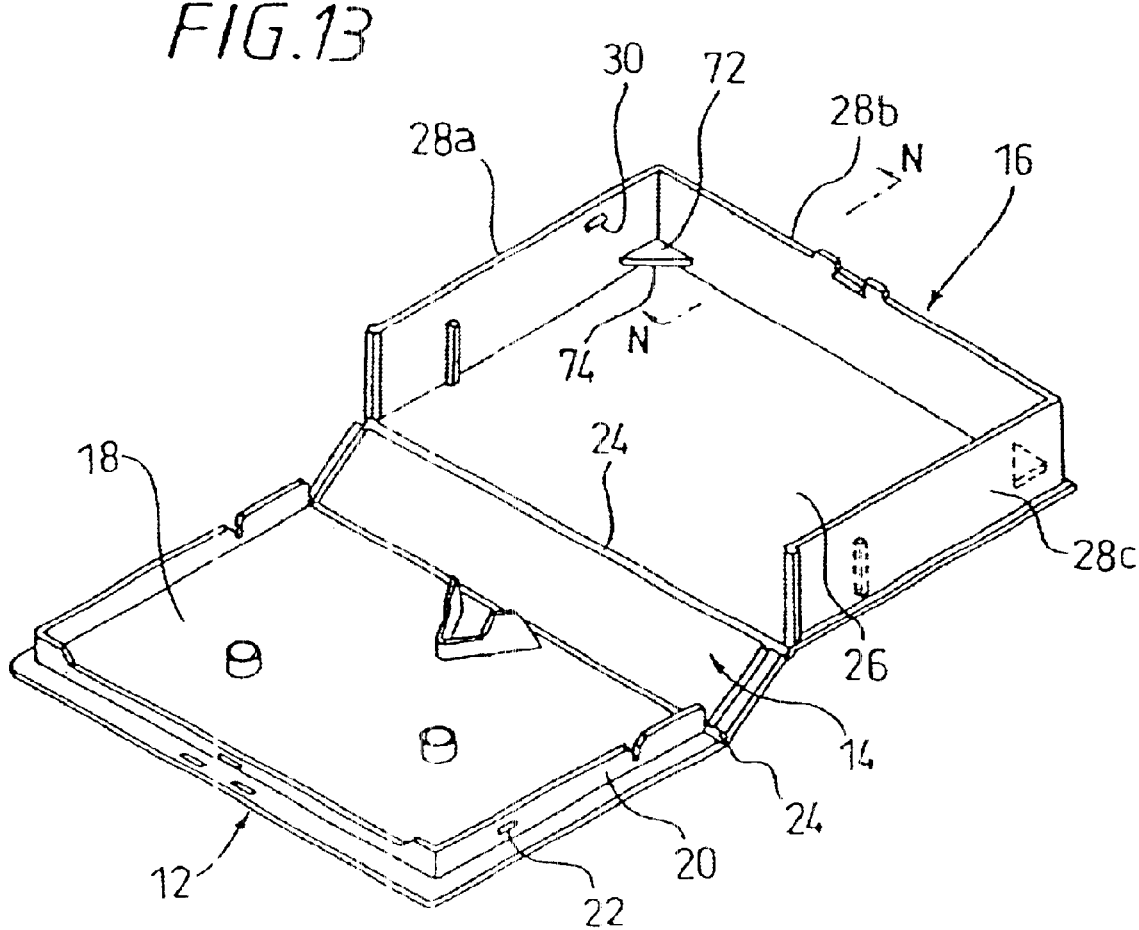
FIG. 13 is a developed view of the storage case according to the fifth embodiment o the present invention.

Now, a fifth embodiment of the present invention will be described. FIG. 13 LS a developed view of the storage case according to the fifth embodiment of the present invention, and FIG. 14 is a sectional view taken along a line N—N in FIG. 17.

Figure 14A:
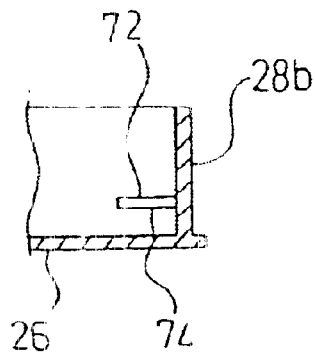
FIG. 14(a) is a sectional view taken along a line N—N of FIG. 13.
Figure 14B:
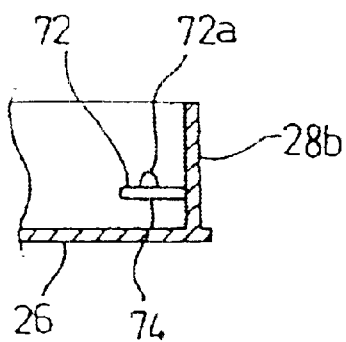
FIG. 14(b) is a sectional view of a modified embodiment.

The fifth embodiment is almost the same in structure as the fourth embodiment, but different from the fourth embodiment in that the pressing rib 72 having a holding rib 74 integrally formed therewith is flat, as shown in FIG. 14(a), at a side confronting the cassette (an upper face in the drawings). The pressing rib 72 serves as the cassette holding part at the side facing the cassette and serves as the holding part for the information sheets at the side facing the lid plate 26. The pressing rib 72 may press the cassette to hold it, or may be simply defined as the cassette holding part. As shown in FIG. 14(b), a projection 72a may be formed at the side confronting the cassette so that the projection 72a may abut the cassette.

This fifth embodiment attains similar effects to the fourth embodiment.

Figure 15:
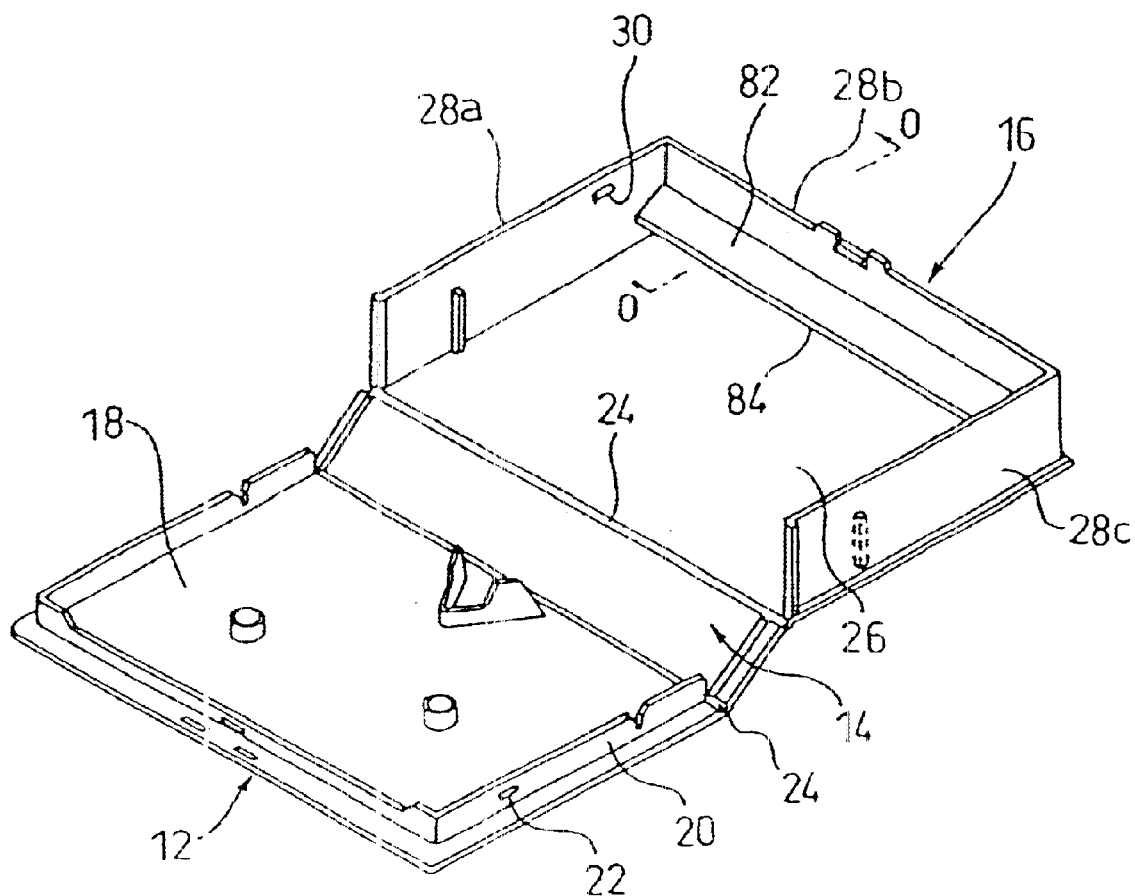
FIG. 15 is a developed view of the storage case according to the sixth embodiment of the present invention.
Figure 16:
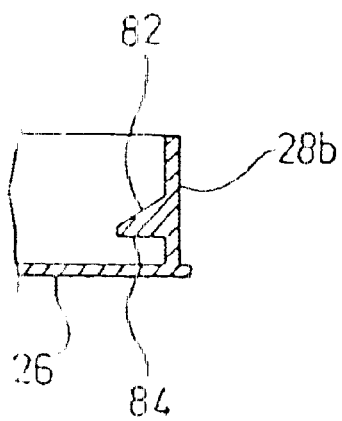
FIG. 16 is a sectional view taken along a line O—O of FIG. 15.

Now, a sixth embodiment of the present invention will be described. FIG. 15 is a developed view of the storage case according to the sixth embodiment of the present invention, and FIG. 16 is a sectional view taken along a line O—O in FIG. 15.

In the sixth embodiment, a pressing rib 82 having a sheet holding rib 84 integrally formed therewith is provided inside the corner between the two adjacent outer walls 28a and 28b, and 28b and 28c bridging both the adjacent outer walls 28a and 28b, and 28b and 28c, and extends in a form of eaves along an entire inner face of the backward outer wall 28b which is located behind the cassette in the closed state. The pressing rib 82 serves as the cassette holding part at the side facing the cassette and serves as the holding part for the information sheets at the side facing the lid plate 26.

Because the pressing rib 82 is provided inside the corner between the two adjacent outer walls 28a and 28b, and 28b and 28c bridging both the adjacent outer walls 28a and 28b, and 28b and 28c, and extends in a form of eaves along the entire inner face of the backward outer wall 28b which is located behind the cassette in the closed state, the pressing rib 82 functions as a reinforcing clamp member, whereby rigidity of the lid portion 16 will be improved and deformation of the lid portion 16 will be prevented. For example, deformation such as inclination of both the outer walls 28a and 28*b*, and 28*b* and 28*c* during thermal shrinkage after injection molding will be avoided, and even when an outer force is applied to the lid portion 16, the outer walls 28*a*, 28*b* and 28*c* will not be deformed.

Figure 17:
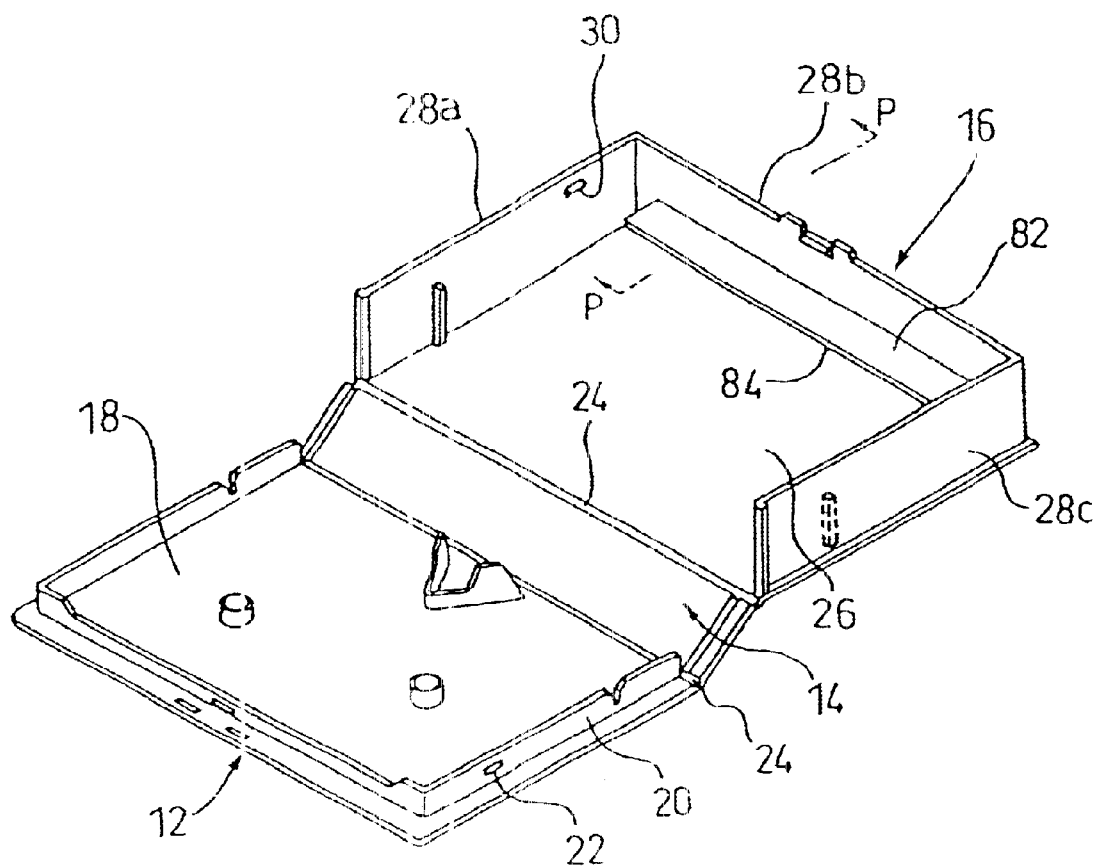
FIG. 17 is a developed view of the storage case according to the seventh embodiment of the present invention.

Now, a seventh embodiment of the present invention will be described. FIG. 17 is a developed view of the storage case according to the seventh embodiment of the present invention, and FIG. 18 is a sectional view taken along a line P—P in FIG. 17.

Figure 18A:
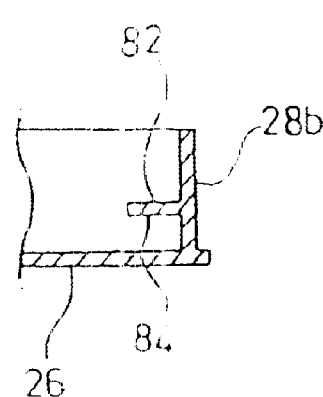
FIG. 18(a) is a sectional view taken along a line P—P of FIG. 17.
Figure 18B:
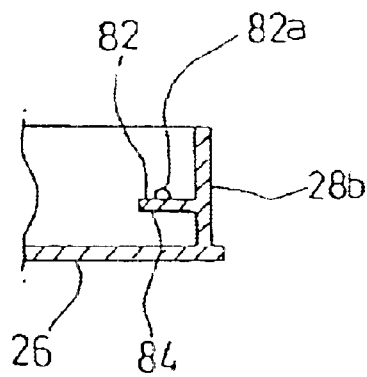
FIG. 18(b) is a sectional view of a modified embodiment.

The seventh embodiment is almost the same in structure as the sixth embodiment, but different from the sixth embodiment in that the pressing rib 82 having the holding rib 84 integrally formed therewith is flat, as shown in FIG. 18(*a*), at a side confronting the cassette (an upper face in the drawings), and that longitudinal opposite ends of the pressing rib 82 are provided with gaps respectively with the outer walls 28*a* and 28*c*. The pressing rib 82 serves as the cassette holding part at the side facing the cassette and serves as the holding part for the information sheets at the side facing the lid plate 26. The pressing rib 82 may press the cassette to hold it, or may be simply defined as the cassette holding part. As shown in FIG. 18(*b*), a projection 82*a* may be formed at the side confronting the cassette so that the projection 82*a* may abut the cassette.

Although the longitudinal opposite ends of the pressing rib 82 are provided with gaps respectively with the outer walls 28*a* and 28*c* in this seventh embodiment, the pressing rib 82 may be so constructed as to extend up to the outer walls 28*a* and 28*c*.

The seventh embodiment attains similar effects to the sixth embodiment.

Figure 19:
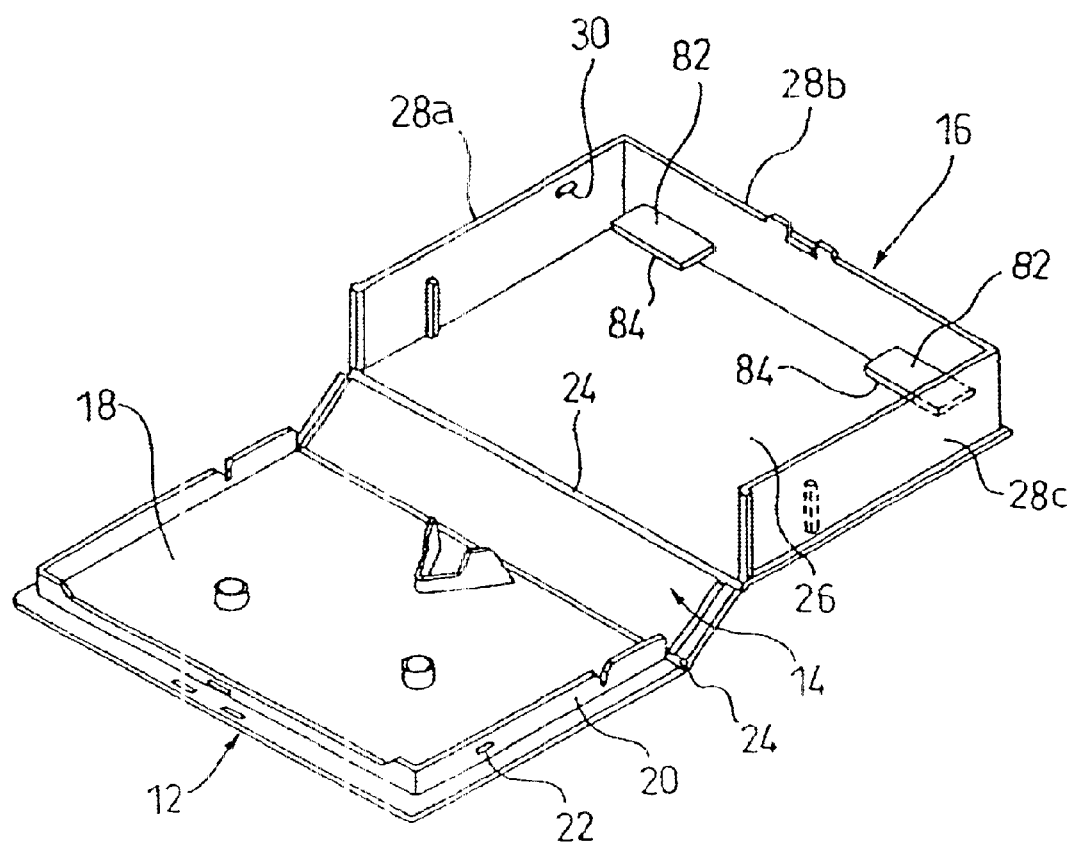
FIG. 19 is a developed view of the storage case according to the eighth embodiment of the present invention.

Now, an eighth embodiment of the present invention will be described. FIG. 19 is a developed view of the storage case according to the eighth embodiment of the present invention. The eighth embodiment is almost the same in structure as the seventh embodiment, but different from the seventh embodiment in that the pressing rib 82 having the holding rib 84 integrally formed therewith is divided in a longitudinal direction into a plurality of pieces. The pressing rib 82 may press the cassette to hold it, or may be simply defined as the cassette holding part. As shown in FIG. 18(*b*), the projection 82*a* may be formed at the side confronting the cassette so that the projection 82*a* may abut the cassette. The pressing rib 82 may be so constructed as to extend to the outer walls 28*a* and 28*c*.

The eighth embodiment attains similar effects to the seventh embodiment.

Figure 20:
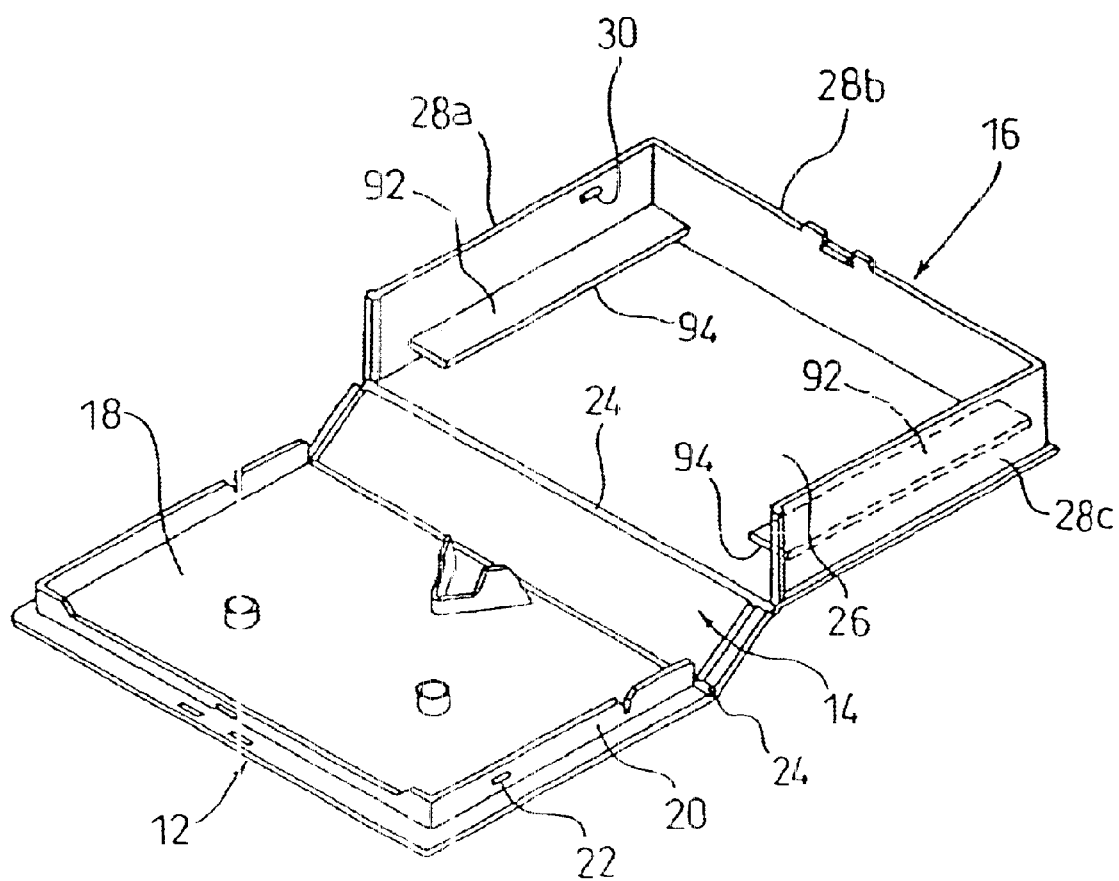
FIG. 20 is a developed view of the storage case according to the ninth embodiment of the present invention.

Now, a ninth embodiment of the present invention will be described. FIG. 20 is a developed view of the storage case according to the ninth embodiment of the present invention.

In the ninth embodiment, pressing ribs 92 having respective sheet holding ribs 94 integrally formed therewith are respectively provided inside the corners between the two adjacent outer walls 28*a* and 28*b*, and 28*b* and 28*c* bridging both the adjacent outer walls 28*a* and 28*b*, and 28*b* and 28*c*, and extend in a form of eaves along the entire inner faces of the sideward outer walls 28*a* and 28*c* which are located at both sides of the cassette in the closed state. Each of the pressing ribs 92 serves as the cassette holding part at the side facing the cassette and serves as the holding part for the information sheets at the side facing the lid plate 26.

The pressing rib 92 in the ninth embodiment has the same sectional shape as in the seventh embodiment shown in FIG. 18(*a*), but may have such a projection as shown in FIG. 18(*b*), or the side facing the cassette may be slanted as in the sixth embodiment shown in FIG. 16. The pressing rib 92 may have a gap with the backward outer wall 28*b*.

Because the pressing ribs 92 are provided inside the corners between the two adjacent outer walls 28*a* and 28*b*, and 28*b* and 28*c* bridging both the adjacent outer walls 28*a* and 28*b*, and 28*b* and 28*c*, and extend in a form of eaves along the entire inner faces of the sideward outer walls 28*a* and 28*c* which are located at the sides of the cassette in the closed state, each the pressing rib 92 functions as a reinforcing clamp member, whereby rigidity of the lid portion 16 will be improved and deformation of the lid portion 16 will be prevented. For example, deformation such as inclination of both the outer walls 28*a* and 28*b*, and 28*b* and 28*c* during thermal shrinkage after injection molding will be avoided, and even when an outer force is applied to the lid portion 16, the outer walls 28*a*, 28*b* and 28*c* will not be deformed.

Figure 21:
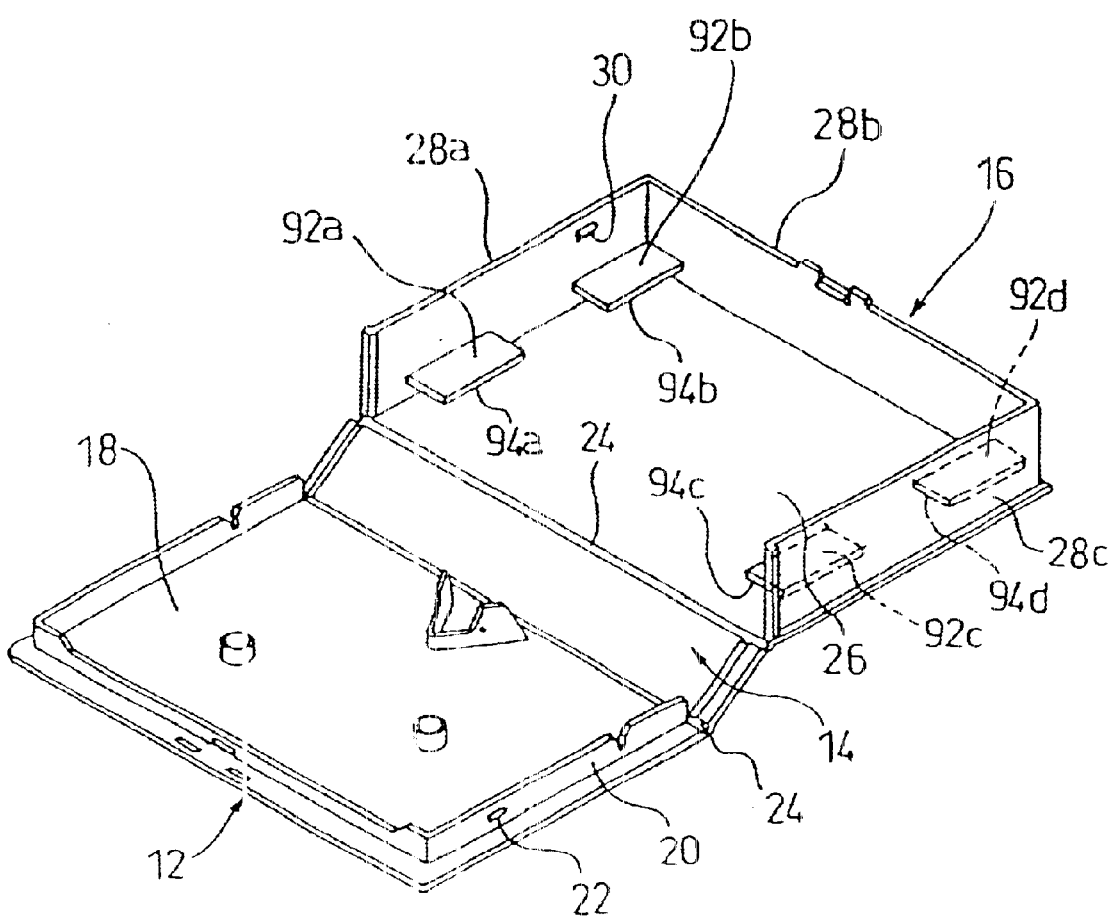
FIG. 21 is a developed view of the storage case according to the tenth embodiment of the present invention.

Now, the tenth embodiment of the present invention will be described. FIG. 21 is a developed view of the storage case according to the tenth embodiment of the present invention. The tenth embodiment is almost the same in structure as the ninth embodiment, but different from the ninth embodiment in that the pressing ribs 92*a* through 92*d* having respective holding ribs 94*a* through 94*d* integrally formed there with are not provided on the entire inner faces of the sideward outer walls 28*a* and 28*c* confronting each other, but provided in a part.

In the tenth embodiment, two each of the pressing ribs 92*a* through 92*d* are provided on the two sideward outer walls 28*a* and 28*c*. However, one each of the pressing ribs may be provided on each of the sideward outer walls 28*a* and 28*c*. In the case where one each of the pressing ribs 92*a* through 92*d* is provided on each of the outer walls 28*a* and 28*c*, the pressing ribs may be either provided respectively at confronting areas of both the outer walls 28*a* and 28*c* (corresponding to a pair of 92*a* and 92*c* or a pair of 92*b* and 92*d*), or may be provided respectively at diagonal areas of the outer walls 28*a* and 28*c* (corresponding to a pair of 92*a* and 92*d* or a pair of 92*b* and 92*c*).

The pressing rib 92 may press the cassette to hold it, or may be simply defined as the cassette holding part. As shown in FIG. 18(*b*), a projection may be formed at the side confronting the cassette so that this projection may abut the cassette, or the side facing the cassette may be slanted as in the sixth embodiment shown in FIG. 16. The pressing rib 92 may have a gap with the backward outer wall 28*b*.

The tenth embodiment attains the similar effect to the ninth embodiment.

Figure 22A:
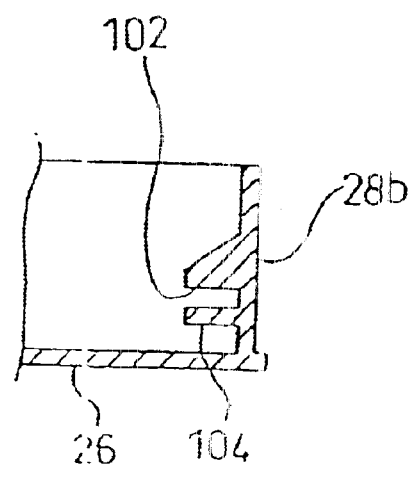
FIGS. 22(a)–22(c) are sectional views of modified embodiments of the present invention.
Figure 22B:
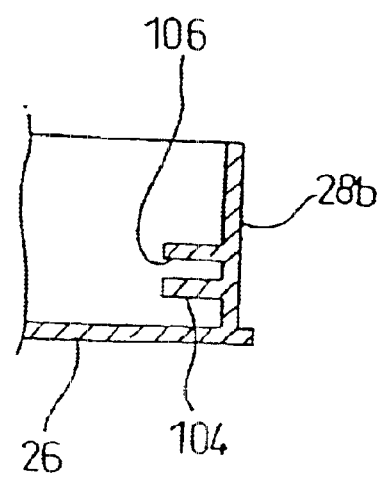
Figure 22C:
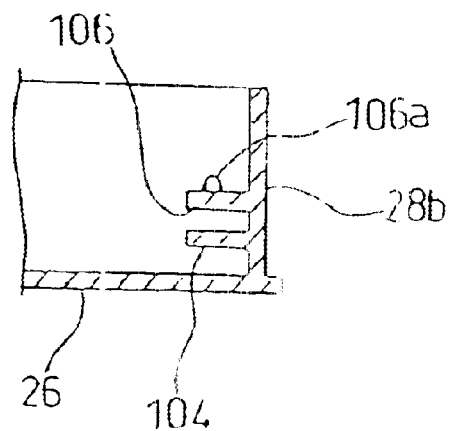

As shown in FIGS. 22(*a*) through (*c*), a plurality of sheet holding ribs may be provided. In the structure as shown in FIG. 22(*a*), two holding ribs 102 and 104 are provided, and the holding rib 102 positioned close to the cassette acts also as the pressing rib to hold the cassette at the side facing thereto.

In the structure as shown in FIG. 22(*b*), two holding ribs 104 and 106 are provided, and the holding rib 106 positioned close to the cassette acts also as the pressing rib to hold the cassette, whose face for pressing the cassette is made flat. In the structure as shown in FIG. 22(*c*), two holding ribs 104 and 106 are provided, and the holding rib 106 positioned close to the cassette acts also as the pressing rib to hold the cassette, the pressing rib being formed with a projection 106*a* as described above.

With this structure wherein a plurality of holding ribs are provided in a certain area, the space for containing the sheets will be limited and a determined thickness of the sheets can be grasped and held.

In the above described embodiments, the sheet holding ribs are integrally formed with the cassette pressing ribs.

However, provided that the holding ribs are intended only to hold the sheets, the holding ribs are not necessarily formed integrally with the cassette pressing ribs, but may be provided independently. In this case, the holding ribs need not have the cassette pressing ability, but as a matter of course, may simply abut the cassette or may define the space for receiving the cassette.

Figure 23:
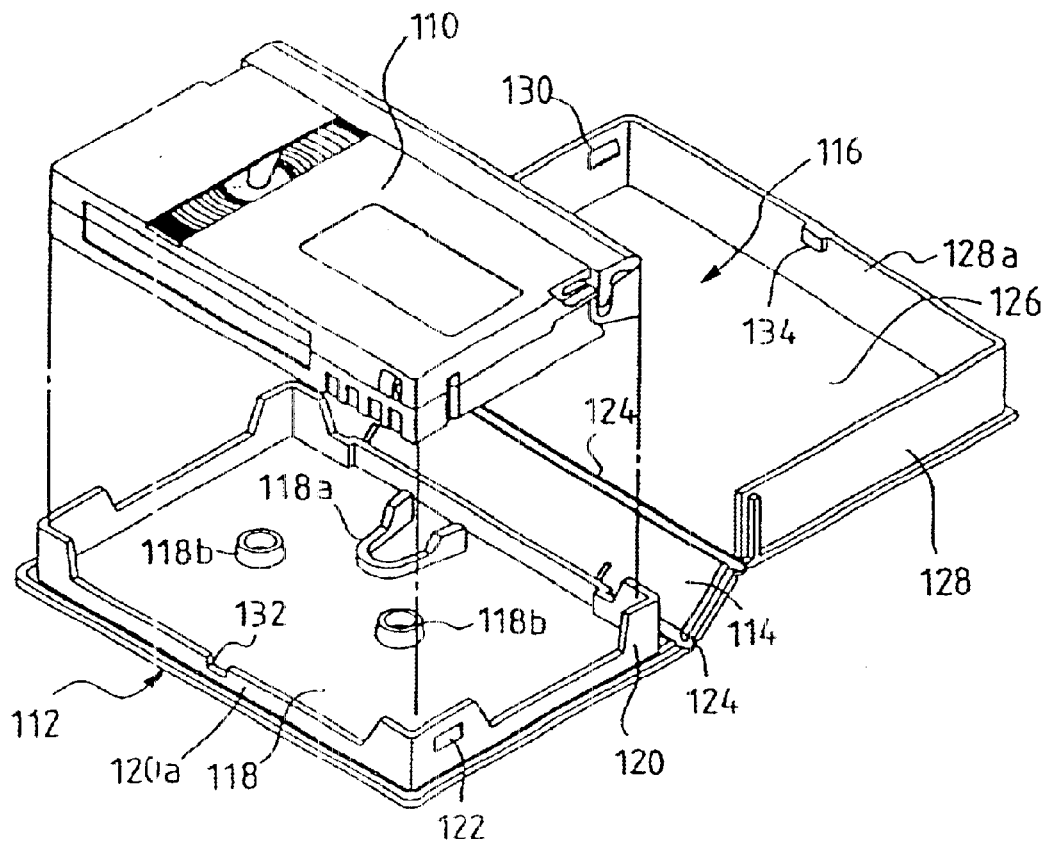
FIG. 23 is a perspective view showing the magnetic tape cassette storage case according to the eleventh embodiment of the present invention in the open state of the lid.
Figure 24:
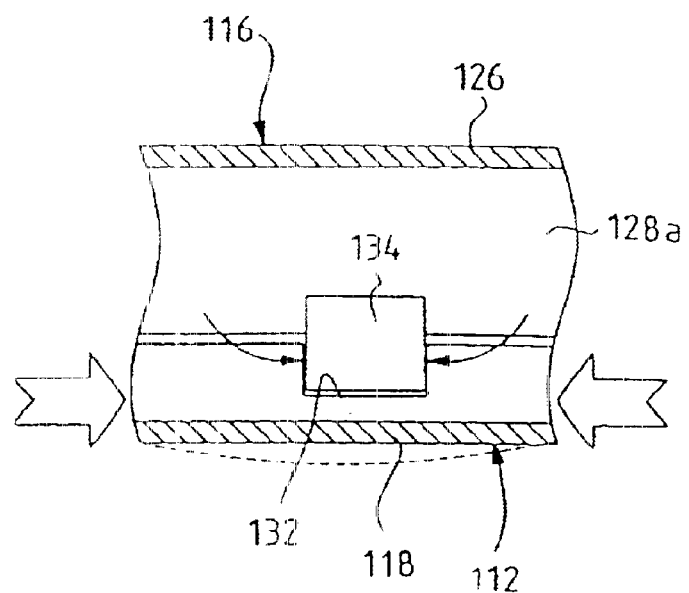
FIG. 24 is a part of a sectional view showing the case in the closed state of the lid.

With reference to the accompanying drawings, preferred embodiments according to the present invention will be explained hereunder, in detail. FIGS. 23 and 24 show a eleventh embodiment of the present invention, of which FIG. 23 illustrates the case in a developed condition, and FIG. 24 illustrates it in a closed condition of the lid.

In the drawings, the magnetic tape cassette storage case is formed by injection molding or the like, and provided with a storing portion 112 for storing the magnetic tape cassette 110, and a lid portion 116 integrally connected to the storing portion 112 at one side in a longitudinal direction by means of a connecting piece 114.

The storing portion 12 includes a flat bottom plate 118 which is formed in a rectangular shape according to an exterior dimension of the magnetic tape cassette 110, and has at its inner face a plurality of positioning and fitting protuberances 118a and recesses 118b corresponding to a configuration of a rear face of the magnetic tape cassette 110, and a frame-like lateral wall 120 which is formed upright around the bottom plate 118 with its four corners made higher and adapted to freely receive the magnetic tape cassette 110. Locking recesses 122 for the lid portion 116 are formed at both side portions of the lateral wall 120 at their forward ends.

Both longitudinal side portions of the connecting piece 114 are integrally connected to the bottom plate 118 of the storing portion 112 and the lid portion 116 to be folded and developed by means of respective thin portions 124 acting as hinges.

The lid portion 116 comprises a lid plate 126 hingeably connected to the connecting piece 114 and an outer wall 128 of a yoke-shaped framework adapted to fit around the outer side portion of the lateral wall 120. A height of the outer wall 128 and a width of the connecting portion 114 are set so as to correspond to a thickness of the magnetic tape cassette 110.

A pair of locking projections 130 are formed inside rotating ends of both side portions of the outer wall 128 for engaging with the locking recesses 122 and holding the lid portion in a closed state, thereby to form a pair of left and right locking mechanisms.

In addition to the above described structure, a recess 132 is formed at an intermediate portion of a lateral wall 120a of the storing portion 112, where the lateral wall 120a located behind the cassette in the closed state and an outer wall 128a of the lid portion 116 which is located behind the cassette in the closed state will be mated. A projection 134 for engaging with the recess 132 is formed at an inner face of the outer wall 128a which is located behind the cassette in the closed state.

Note that it is preferable that a longitudinal length of the projection 134 is substantially coincided with that of he recess 132.

Thus the projection 134 is engaged in the recess 132 when the lid is closed, as shown partly enlarged in FIG. 24.

When the external force for swelling the bottom plate 118 outward is applied in this state, it will become a force for diminishing the recess 132 contrarily. However, the projection 134 enters into the recess 132 to restrain the force, thus maintaining the bottom plate 118 rectilinearly to prevent the open-mouth phenomenon.

Figure 25:
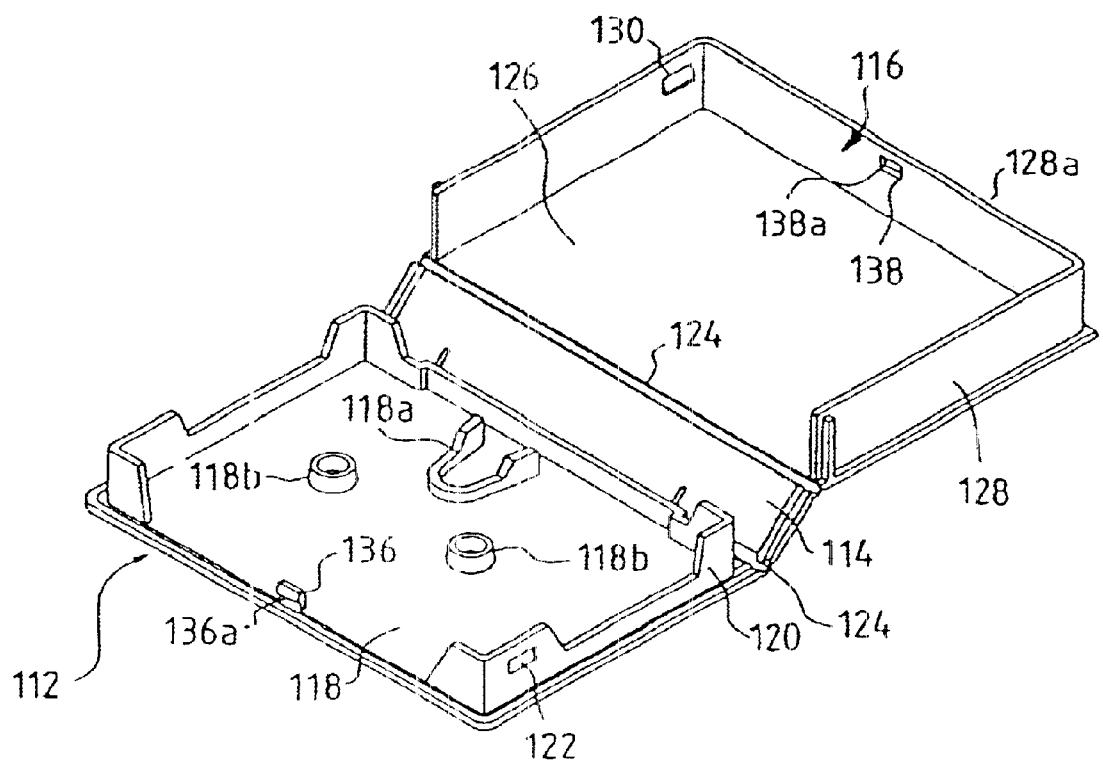
FIG. 25 is a perspective view showing the magnetic tape cassette storage case according to the twelfth embodiment of the present invention in the open state of the lid.

FIGS. 24 and 25 show a twelfth embodiment according to the present invention. In the drawings, the same parts are designated by the same reference numerals as in the eleventh embodiment, and their explanation will be omitted. Different reference numerals are assigned to those parts which are different from the eleventh embodiment.

The magnetic tape cassette is often used with a back label having a bar code attached to the back face thereof. This back label is positioned near the outer wall 128 of the lid plate 126 when the storage case is closed, so that the bar code can be read from the exterior of a transparent storage case for the magnetic tape cassette. However, in case where the bar code reading area on the outer wall 128 of the lid plate 126 has protuberances or recesses, or is elastically deformed, reading of the bar code at a sensor side becomes imperfect.

Therefore, in the present embodiment, the front edge of the bottom plate 118 is formed flat without providing any protuberance. At the intermediate portion of the front edge of the bottom plate 118, is formed an engaging projection 136 having an engaging hook 136a projecting forward.

Correspondingly to the engaging protection 136, the outer wall 128 is formed, at the front middle portion of the inner face, with an engaging recess 138 having an engaging step 138a adapted to engage with the engaging projection 136. These engaging projection 136 and the recess 138 constitute a locking mechanism which acts in the same manner as the aforementioned right and left locking mechanisms. The position of this locking mechanism is below the reading area of the bar code as shown in FIG. 26.

Figure 26:
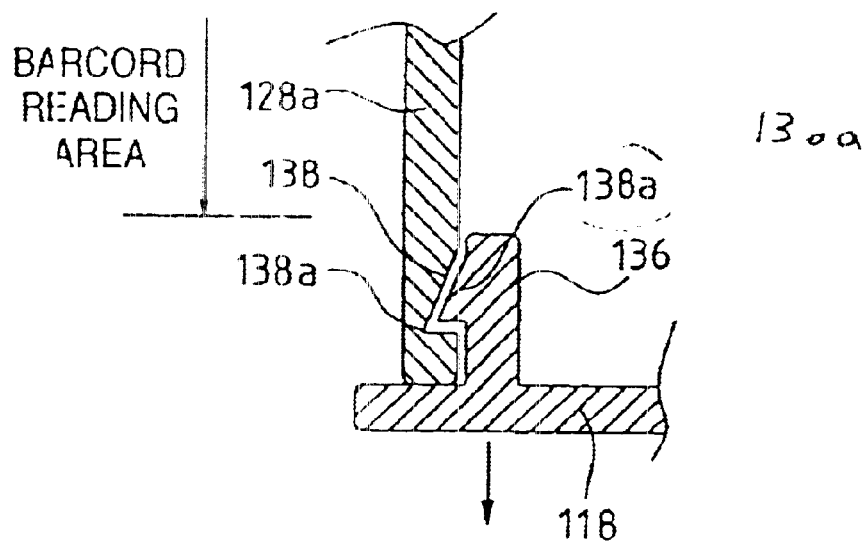
FIG. 26 is a part of a sectional view showing the case in the closed state of the lid.

In the above arrangement as illustrated enlarged in FIG. 26, the engaging hook 136a is adapted to enter into the recess 138 in such a manner as eating into the recess in the closed state of the lid portion. In addition to the locking by means of the locking projections 130 and the locking recesses 122 at the both sides, this portion of the storage case is thus locked.

The above described locking mechanism is accompanied by elastic deformation of the resin. However since the locking action is performed below the reading area of the bar code, there will be no deformation at this reading area 140a. Therefore, the bar code reading will not be hindered in the closed state.

On this occasion, when a force for swelling the bottom plate 118 outward is applied as shown by an arrow in FIG. 26 in a direction traversing the paper face, the force will act to pull out the engaging hook 136a, which however, will be blocked by the engaging step 138a, whereby the bottom plate 118 is maintained rectilinearly thus preventing the open-mouth.

Figure 27:
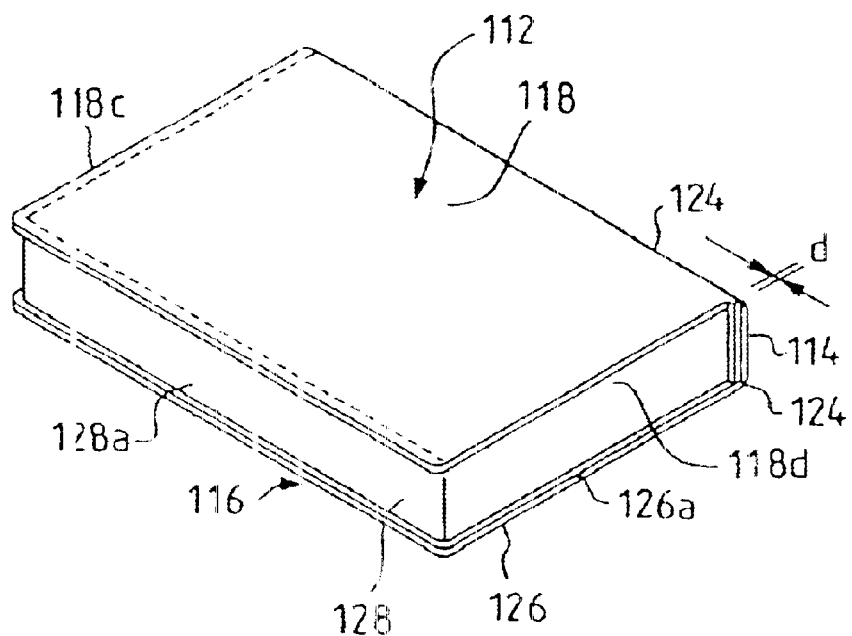
FIG. 27 is a perspective view snowing the magnetic tape cassette storage case according to the thirteenth embodiment of the present invention in the closed state of the lid.

FIG. 27 shows a thirteenth embodiment of this invention. In the above explained embodiments including the conventional case, the storing portion 112 consists of the bottom plate 118, and the lateral wall 120 formed upright around the bottom plate 118. There is formed a flange 118c around the lateral wall 120 slightly projecting outward. Similarly around the lid plate 126 of the lid portion 116 is formed a flange 126a projecting from the outer wall 128 by the same projecting amount.

In the instant embodiment, the flange 118d at one shorter edge of the bottom plate 118 is cut away by a predetermined width d to be flush with the surface of the outer wall 128 of the lid portion 118. Due to the presence of the cut away portion 118d, when a force is applied to the entire magnetic tape cassette storage case from both longitudinal ends thereof the force will press only both ends in a direction of the shorter edges of the lid plate 126, but will not press the bottom plate 118, enabling the storing portion 112 to be kept rectilinearly.

Further, the lid plate 126 is reinforced with the outer wall 128 and the connecting piece 114 at the entire periphery. Therefore, the lid plate 126 will not deform even if some pressing force is applied to this area. Thus, the shape can be maintained and as a result, the open-mouth phenomenon due to flexion of the storing portion 112 can be prevented beforehand.

Figure 28:
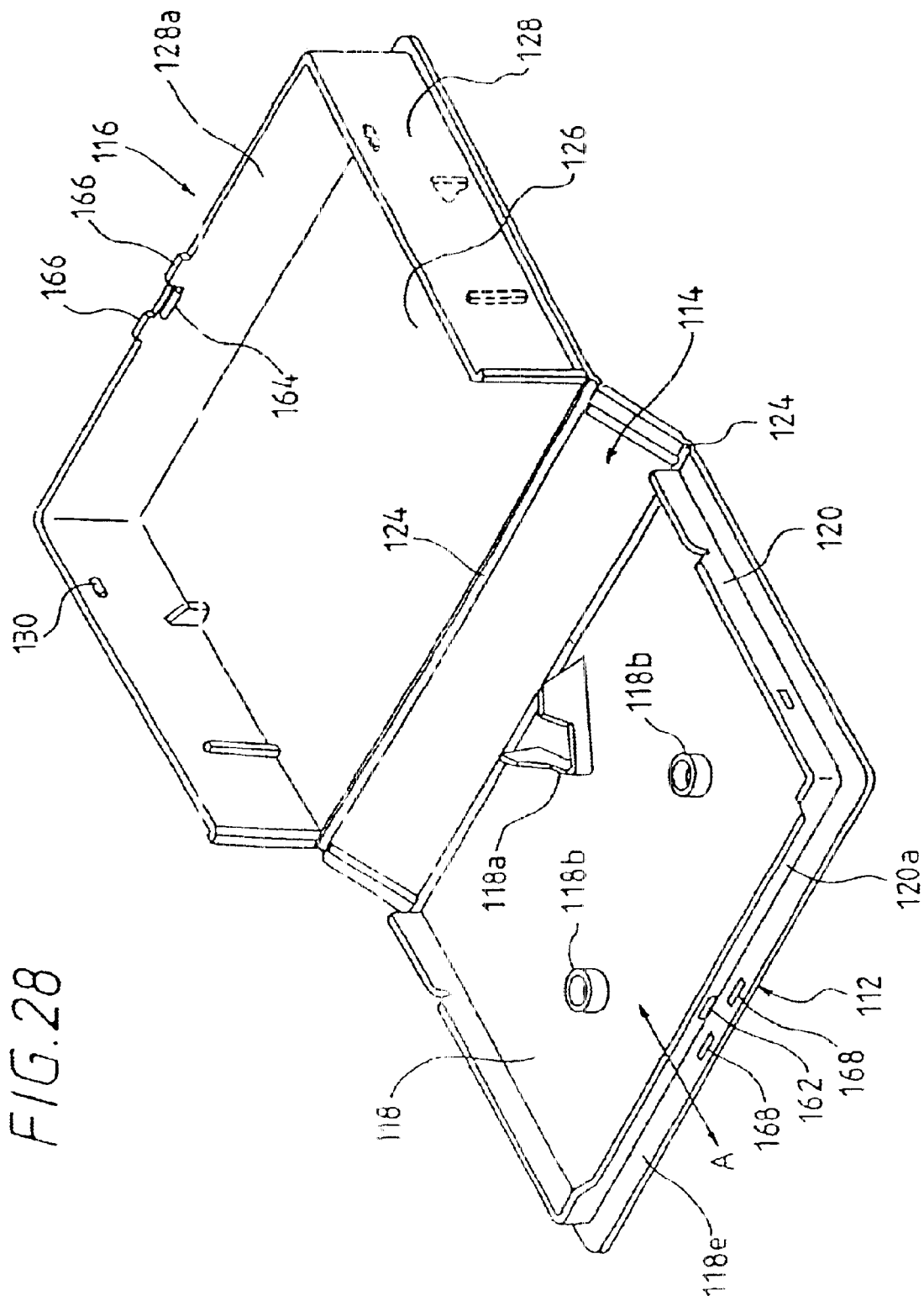
FIG. 28 is a perspective view showing the magnetic tape cassette storage case according to the fourteenth embodiment of the present invention in the closed state of the lid.

FIG. 28 shows a fourteenth embodiment according to the present invention. In this fourteenth embodiment, a projection 164 formed inside the outer wall 128a of the lid portion 116 which is located behind the cassette in the closed state and a recess 162 formed in the lateral wall 120a of the storing portion 112 which is located behind the cassette in the closed state are constructed in such a manner that they engage with each other in a direction A perpendicularly to the direction in which the lid is opened.

Near the projection 164 formed inside the outer wall 128a, are further formed at both sides of the projection 164, a pair of projected edges 166 which extend from the outer wall 128a in the same planar direction as the outer wall 198a. On the other hand, a pair of recesses 168 for engaging with the projected edges 166 are formed at an area of a flange 118e of the bottom plate 118, which the projected edges 166 confront in the closed state.

Figure 1:
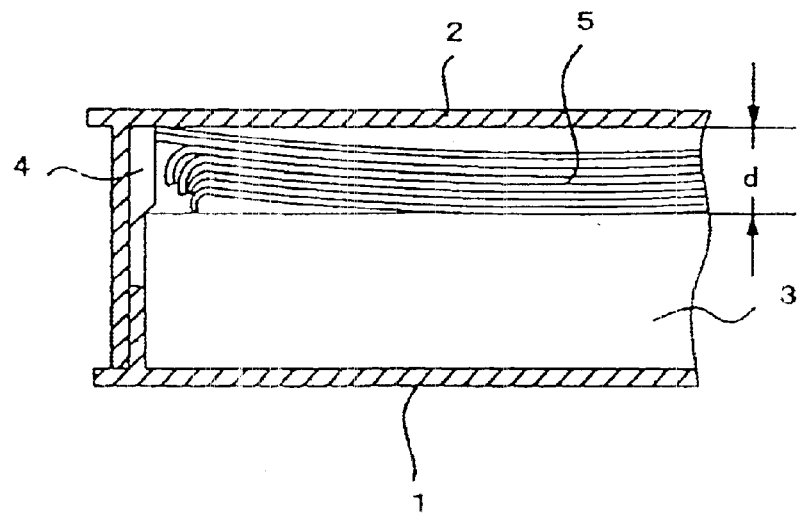
FIG. 1 is a part of a sectional view of the conventional magnetic tape cassette storage case in the closed state of the lid portion.
Figure 2:
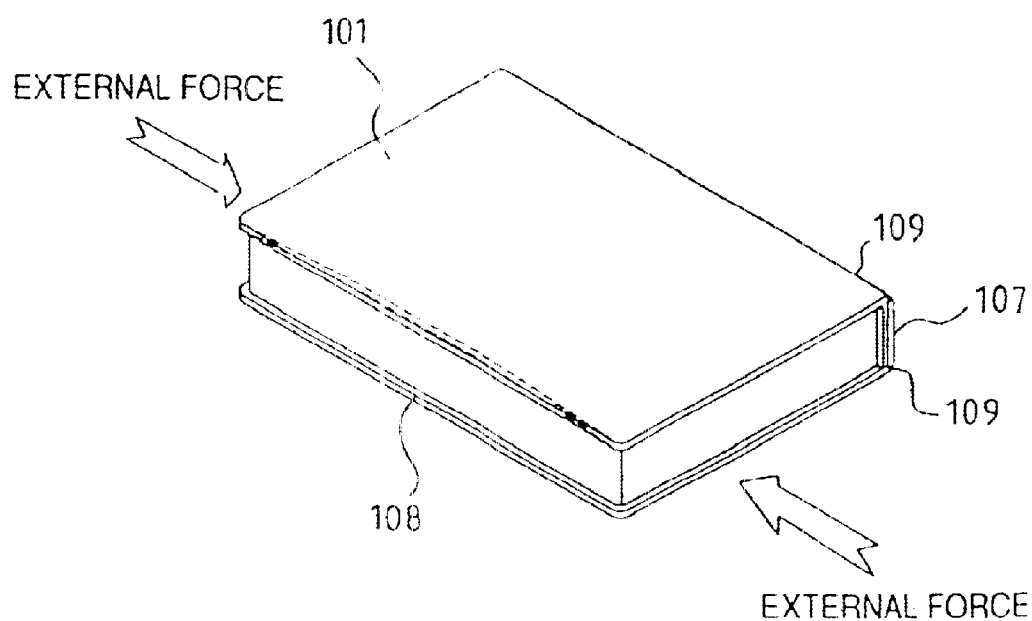
FIG. 2 is a perspective view of the conventional magnetic tape cassette storage case in the closed state of the lid.
Figure 3:
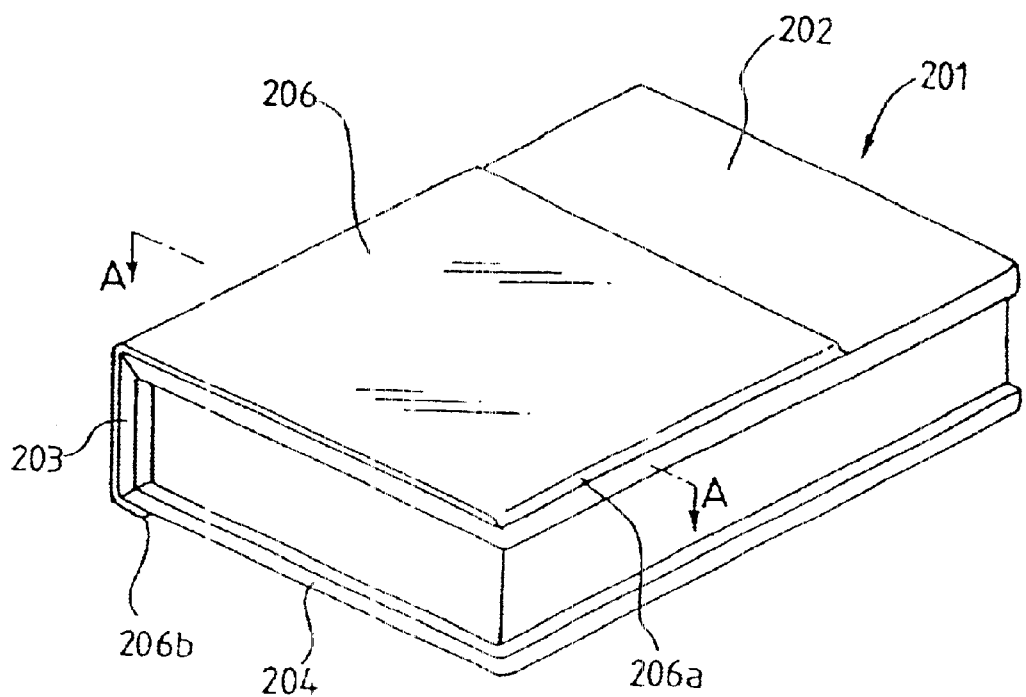
FIG. 3 is a perspective view showing a conventional magnetic tape cassette storage case.
Figure 4:
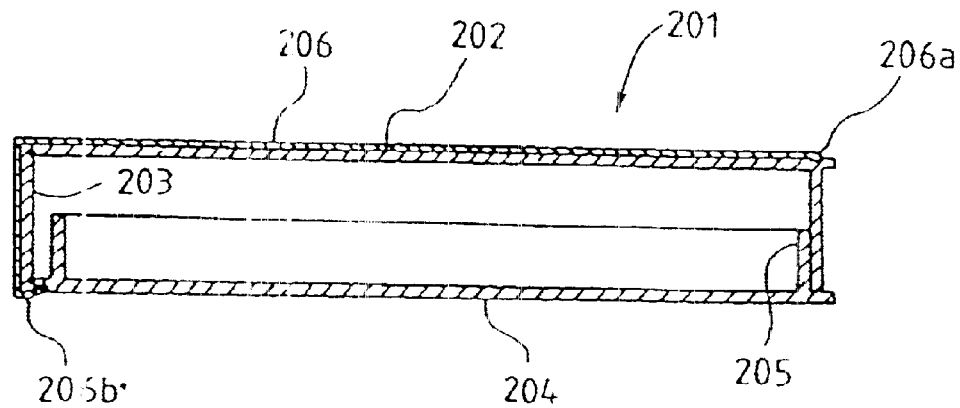
FIG. 4 is a sectional view taken along a line A—A in FIG. 3.

In this fourteenth embodiment, the open-mouth between the storing portion 112 and the lid portion 116 can be prevented, because the projection 164 of the outer wall 128a and the recess 162 of the lateral wall 120a engage with each other. Further, due to the fact that the projected edges 166 formed in the outer wall 128a and the recesses 168 formed in the flange 118e of the bottom plate 118 engage with each other, the engagement between the projection 164 and the recess 162 for preventing the open-mouth can be reliably maintained. For example, not only the open-mouth between the storing portion 112 and the lid portion 116 as described before referring to FIG. 2 can be reliably prevented by the engagement between the projection 164 and the recess 162, but also, even if a substantially perpendicular outer force is applied to the bottom plate 118 near the locking part, the engagement between the projected edges 166 and the recesses 168 will surely prevent the flange 118e of the bottom plate 118 from being deformed to withdraw inside the outer wall 128a of the lid portion 116.

Figure 29:
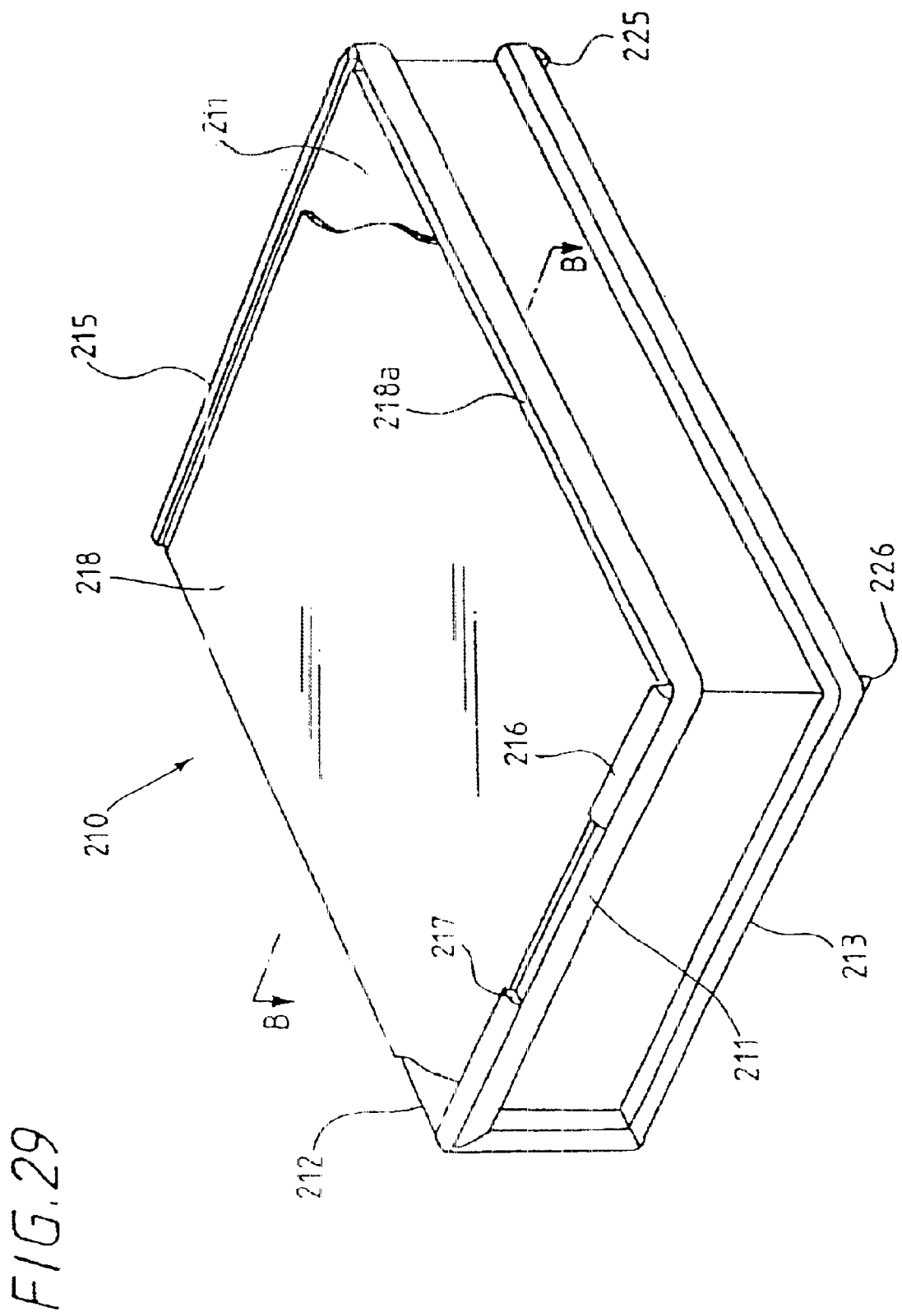
FIG. 29 is a perspective view of the magnetic tape cassette storage case according to a fifteenth embodiment of the present invention.

With reference to the accompanying drawings, embodiments according to the present invention will be explained hereunder in detail. FIG. 29 is a perspective view showing the magnetic tape cassette storage case which is a fifteenth embodiment according to this invention, and FIG. 30 is a sectional view taken along a line B—B in FIG. 29

Figure 30:
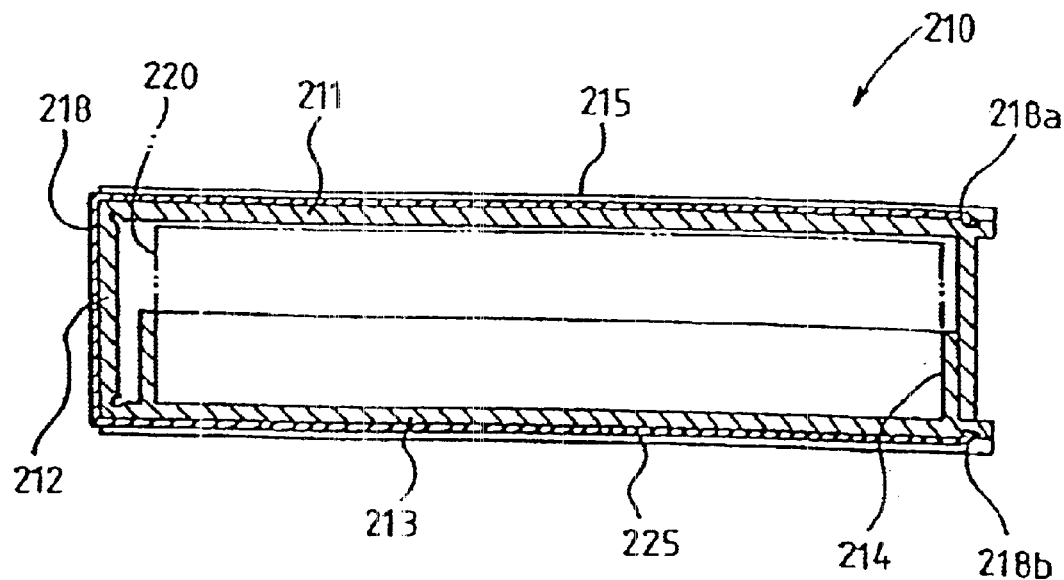
FIG. 30 is a sectional view taken along a line B—B in FIG. 29.

As shown in FIG. 30, the magnetic tape cassette storage case 210 comprises a storing portion 213 provided with a lateral wall 214, a lid portion 211, and a connecting piece 212 connecting the storing portion 213 and the lid portion 211 to be opened or closed. All these parts are integrally formed of synthetic resin in this magnetic tape cassette storage case 210, are provided a plurality of ridges 215, 216, 225 and 226 along longitudinal opposite edges of the lid portion 211 and the storing portion 214. These ridges 215, 216, 225 and 226 are formed along the entire length of the edges of the lid portion 211. A cut-out 217 is formed in one of the ridges 216 at an intermediate portion thereof. The position of the cut-out 217 is not particularly defined at the intermediate portion.

A transparent sheet 218 is arranged over the magnetic tape cassette storage case 210 so as to cover the entire surface of the lid portion 211, the connecting piece 212 and the storing portion 213. The transparent sheet 218 is stretchingly provided by welding its one side edge 218a to an end side edge of the lid portion 211 of the case 210 and by welding its other side edge 218b to an end side edge of the storing portion 213.

In the so constructed magnetic tape cassette storage case 210, when one side of the lid portion 211 is forced upward with respect to the storing portion 213, each corner between the other side of the lid portion 211 and the connecting piece 212 is widened, while each corner between the connecting piece 212 and the storing portion 213 is also widened thereby to open the lid portion 211. Then, the magnetic tape cassette 220 is encased inside the case. Between the transparent sheet 218 and the lid portion 211 is inserted the information sheet such as a label, a memorandum for record or the like. The information sheet contained between the transparent sheet 218 and the lid portion 211 is prevented from slipping out due to the presence of the ridges 215, 216, 225 and 226. In order to take out the information sheet from between the transparent sheet 218 and the lid portion 211, one can insert his fingers under the information sheet through the cut-out 217 to catch it with the fingers, and the information sheet can be easily pulled out from between the transparent sheet 218 and the lid portion 211.

Figure 31:
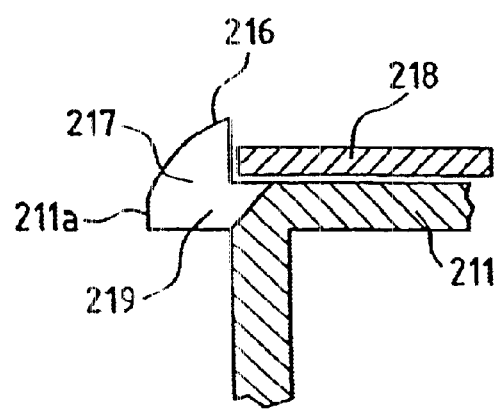
FIG. 31 is a sectional view of the essential part of sixteenth embodiment of the present invention.

FIG. 31 shows a sixteenth embodiment of the magnetic tape cassette storage case 210 according to the present invention. In this magnetic tape cassette storage case 210, a cut-out 219 is additionally formed at an end portion 211a of the lid portion 211 which corresponds in position to the cut-out 217 in the above-described embodiment. In case of this magnetic tape cassette storage case 210, since the fingers can be inserted under the information sheet from the cut-out 219 through the cut-out 217, the information sheet can be more easily caught when taking it out.

The ridges 215, 216, 225 and 226 are continuously formed along the entire edges of the lid portion 211 except the cut-out 217 in the above embodiments. However, these ridges 215, 216, 225 and 226 may be formed intermittently. Further, it is enough if these ridges 215, 216, 225 and 226 are projecting relative to the fitting face of the transparent sheet 218, and therefore, in case where the fitting face is formed lower than the surface of the lid portion 211, the ridges 215, 216, 225 and 226 may be of the same height as the lid portion 211.

In the above described embodiments, the transparent sheet 218 is welded to cover the entire surface of the lid portion 211, the connecting piece 212 and the storing portion 213 for enabling a maximum size of the information sheet to be contained. However, the transparent sheet 218 may be welded so as to cover only the lid portion 211 and the connecting piece 212.

Industrial Applicability

While each embodiments of the present invention are separately explained in the above-mentioned description, the technical concept of respective embodiment can be applicable to another embodiments.

It is obvious from the foregoing description that in the storage case for the magnetic tape cassette according to the first aspect of the invention, the information sheets can be secured in a position by gripping the paper ends of the information sheets with the holding ribs formed in the pressing ribs provided inside the lid portion. Thus, a large amount of the information sheets can be fixedly positioned and stored inside the lid portion.

According to the second aspect of the invention, the storing portion is formed with the recess at the mating position between the storing portion and the lid portion at the longitudinally middle position in the closed state, and the lid portion is formed with the projection for engaging with the recess. When the external force is applied to swell the storing portion outward in the longitudinal direction, the recess tends to decrease. However, the decrease of the recess is hindered by the projection on the lid portion to keep the storing portion rectilinearly, and thus the outward swelling of the storing portion by the external force and the succeeding open-mouth will be prevented beforehand without an increase in thickness of the material.

According to the second aspect of the invention, the storing portion is formed with the engaging projection at the mating position between the storing portion and the lid portion at the longitudinally middle position in the closed state, and the lid portion is formed inside with the engaging recess for engaging with the engaging projection to constitute the locking mechanism. Since the position of this locking mechanism is off the reading area of the bar code on the back label provided on the back face of the magnetic tape cassette, the mating position between the snoring portion and the lid portion tending to cause the open-mouth is locked, and therefore, the outward swelling and the succeeding open-mouth can be prevented beforehand without an increase in thickness of the material. Further, since the locking position is off the reading area of the bar code on the back label of the magnetic tape cassette, the locking mechanism will not be an obstacle for the bar code reading nor incur the inconvenience in the bar code reading due to the elastic deformation by the locking mechanism.

According to the second aspect of the invention, although the bottom plate of the storing portion and the lid plate of the lid portion are formed projectingly outward beyond the lateral wall and the outer wall, the projected part at one shorter side of the storing portion is cut away, so that the load from the longitudinal both ends may not be applied to the projected part of the lid portion. Thus the external force itself will not be applied to the storing portion, whereby the outward swelling and the accompanying open-mouth of the storing portion can be prevented beforehand. Furthermore, because there is added no deflection preventing mechanism nor locking mechanism, the arrangement for preventing the open-mouth can be most simply realized.

As described hereinabove, because the transparent sheet is stretched over the entire surface of the lid portion and the connecting piece, between the ridges formed in the longitudinal opposite side edges of the lid portion, the satisfactorily large information sheet can be contained between the transparent sheet and the lid portion as well as the connecting piece, and the contained information sheet can be prevented from slipping out by means of the ridges.

With the structure in which the cut-out is formed in at least one of the ridges, the fingers can be inserted through the cut-out in the ridge, thus enabling the information sheet inside to be easily pulled out.

With the structure in which the further cut-out is formed at the edge of the lid portion corresponding to the cut-out in the ridge, the fingers can be inserted from the cut-out in the lid portion through the cut-out in the ridge, thus enabling the information sheer inside to be more easily pulled out.

What is claimed is:

1. A magnetic tape cassette storage case comprising:
   a storing portion (213) for storing a magnetic tape cassette;
   a lid portion (211) for covering said storing portion; and
   a connecting piece (212) for connecting said storing portion and said lid portion to be opened or closed,
      wherein said storing portion (213), said lid portion (211) and said connecting piece (212) are integrally formed of synthetic resin,
      wherein said lid portion (211) is formed with ridges (215, 216, 225, 226) at longitudinal opposite edges of said lid portion, and
      wherein a transparent sheet (218) is provided between said ridges with one side edge (218a) of said transparent sheet welded to a latitudinal side edge of the lid portion to cover at least the lid portion and the connecting piece, and another side edge (218b) of the transparent sheet welded to the storing portion,
   wherein at lest one of said ridges is provided with a cut-out (217).

2. The magnetic tape cassette storage case according to claim 9, wherein said lid portion (211) has another cut-out (219) at a position corresponding to said cut-out (217) of said at least one of said ridges.

3. A magnetic tape cassette storage case comprising:
   a storing portion (213) for storing a magnetic tape cassette;
   a lid portion (211) for covering said storing portion; and
   a connecting piece (212) for connecting said storing portion and said lid portion to be opened or closed,
      wherein said storing portion (213), said lid portion (211) and said connecting piece (212) are integrally formed of synthetic resin,
      wherein said lid portion (211) is formed with ridges (215, 216, 225, 226) at longitudinal opposite edges of said lid portion, and
      wherein a transparent sheet (218) is provided between said ridges with one side edge (218a) of said transparent sheet welded to a latitudinal side edge of the lid portion to cover at least the lid portion and the connecting piece, and another side edge (218b) of the transparent sheet welded to the storing portion,
   wherein a height of the ridges (215, 216, 225, 226) is higher than a height of a sheet, which is inserted between said transparent sheet (218) and a surface portion of the lid portion (211), in a vertical direction with respect to said surface portion of the lid portion (211).

4. The magnetic tape cassette storage case according to claim 1,
   wherein said ridges (215, 216, 225, 226) are continuously formed along said longitudinal opposite edges of said lid portion (211).

5. The magnetic tape cassette storage case according to claim 1,
   wherein said ridges (215, 216, 225, 226) are intermittently formed along said longitudinal opposite edges of said lid portion (211).

* * * * *